(12) United States Patent
Tran

(10) Patent No.: US 8,350,654 B2
(45) Date of Patent: Jan. 8, 2013

(54) PRINCIPLES OF THE TRAN-ENERGY MACHINES

(76) Inventor: Cong Toan Tran, Purmerend (NL)

( * ) Notice: Subject to any disclaimer, the term of this patent is extended or adjusted under 35 U.S.C. 154(b) by 345 days.

(21) Appl. No.: 12/810,529

(22) PCT Filed: Mar. 13, 2008

(86) PCT No.: PCT/IB2008/000796
§ 371 (c)(1),
(2), (4) Date: Jun. 25, 2010

(87) PCT Pub. No.: WO2009/112877
PCT Pub. Date: Sep. 17, 2009

(65) Prior Publication Data
US 2010/0264730 A1    Oct. 21, 2010

(51) Int. Cl.
*H01F 21/00* (2006.01)
*H01F 21/04* (2006.01)
*H01F 21/06* (2006.01)
(52) U.S. Cl. ........ 336/110; 336/115; 336/117; 336/118; 336/119; 336/130; 336/131; 336/132
(58) Field of Classification Search .................. 336/110, 336/115, 117, 118, 119, 130, 131, 132
See application file for complete search history.

(56) References Cited

U.S. PATENT DOCUMENTS

| | | | | |
|---|---|---|---|---|
| 2,736,821 | A | * | 2/1956 | Stineman ........................ 307/64 |
| 2,824,272 | A | * | 2/1958 | Delaporte ...................... 318/734 |
| 3,223,917 | A | * | 12/1965 | Schweitzer, Jr. .............. 363/170 |
| 3,428,868 | A | * | 2/1969 | Duckitt et al. ................ 361/171 |
| 4,600,964 | A | * | 7/1986 | Ela et al. ....................... 361/144 |
| 4,965,695 | A | | 10/1990 | Baumann |
| 6,051,902 | A | | 4/2000 | Ogino |
| 6,242,834 | B1 | | 6/2001 | Akemakou |
| 6,246,561 | B1 | | 6/2001 | Flynn |
| 6,342,746 | B1 | | 1/2002 | Flynn |
| 6,946,938 | B1 | | 9/2005 | Pedersen |
| 2009/0231891 | A1 | * | 9/2009 | Laitinen et al. ................. 363/44 |

FOREIGN PATENT DOCUMENTS

EP    0 872 946    10/1998
(Continued)

OTHER PUBLICATIONS

"Hall Effect Encoding of Brushless DC Motors", NASA Tech Brief, published May 1970.
(Continued)

*Primary Examiner* — Mohamad Musleh
*Assistant Examiner* — Tsz Chan
(74) *Attorney, Agent, or Firm* — Clement A. Berard, Esq.; Dann, Dorfman, Herrell & Skillman, PC

(57) ABSTRACT

A Tran-Energy Machine is an energy conversion device to regain electric energy supplied to activated coils, from the total magnetic flux in the activated coils, and the rising and falling of magnetic flux lines of movable permanent magnets. The device may include one or more timing switches, electronic components in electric circuits, magnetic cores, permanent magnets, rotary parts, inductive coils, activation windings, rectifiers, and output switches. The one or more permanent magnets may be movably arranged with respect to the magnetic core for inducing alternating magnetic field upon movement, wherein activating and deactivating the windings attracts and repels the movable magnets generating regained energy from kinetic movement and changes in magnetic flux.

22 Claims, 27 Drawing Sheets

FOREIGN PATENT DOCUMENTS

WO   00/07285   2/2000

OTHER PUBLICATIONS

"All Motors are Stepping Motors", Motion Control Technology, 2006.

"Brushless DC Motors Turn to Integrated Controllers", Motion Control Technology, 2006.

International Search Report dated Feb. 3, 2009 of PCT/IB2008/000796.

\* cited by examiner

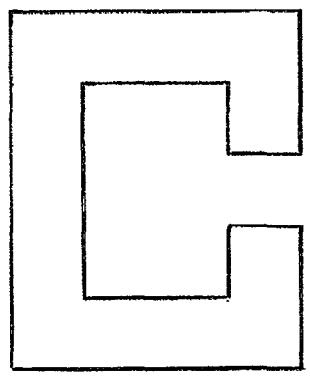
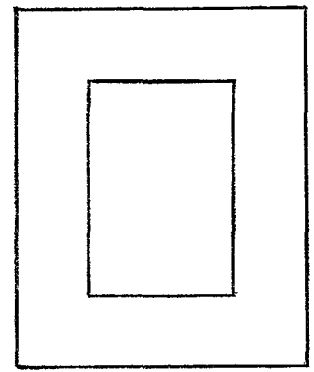
Fig. 1a
Fig. 1b
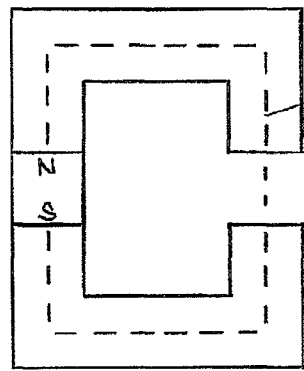
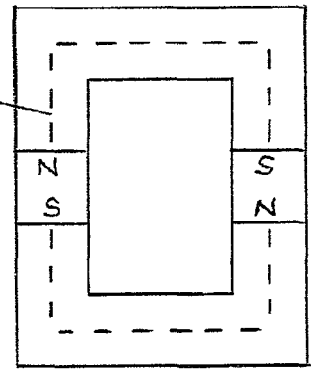
Fig. 1c
Fig. 1d
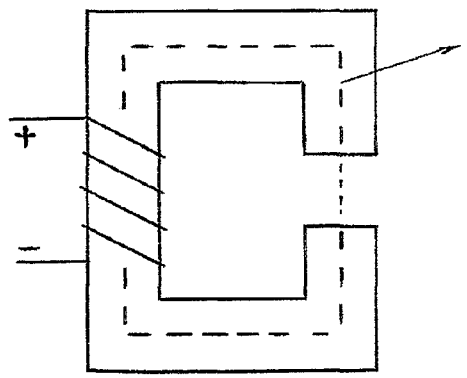
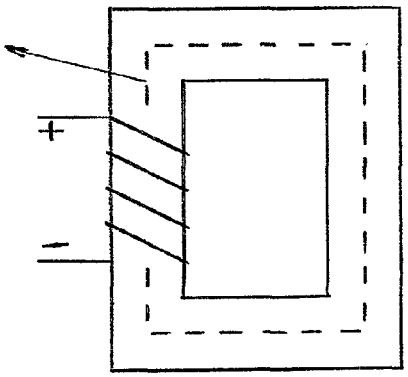
Fig. 1e
Fig. 1f

| | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ |
|---|---|---|---|---|---|---|---|---|---|---|---|---|
| A | Off | — | — | — | — | On | On | On | Off | — | — | — |
| B | Off | — | — | — | On | On | On | Off | — | — | — | — |
| C | Off | — | — | On | On | On | Off | — | — | — | — | — |
| D | Off | — | On | On | On | Off | — | — | — | — | — | — |
| E | Off | On | On | On | Off | — | — | — | — | — | — | On |
| F | On | On | On | Off | — | — | — | — | — | — | On | On |

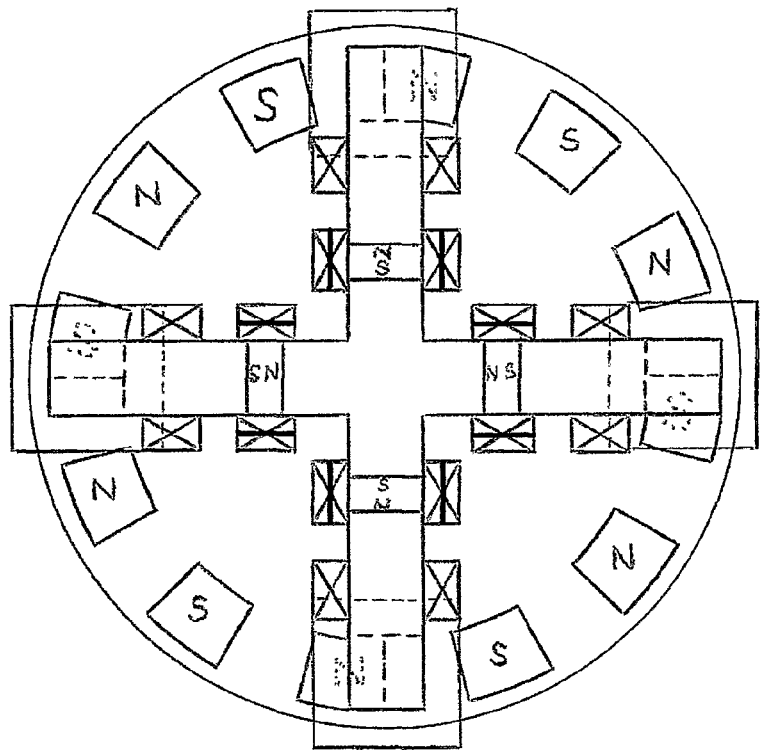
Fig. 20
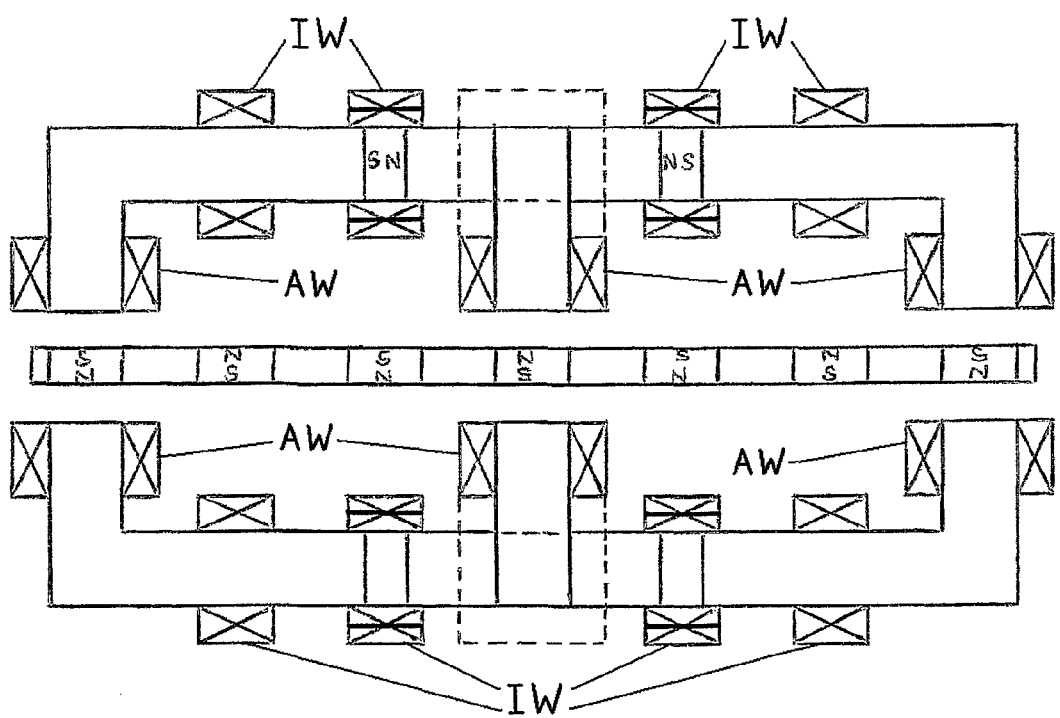

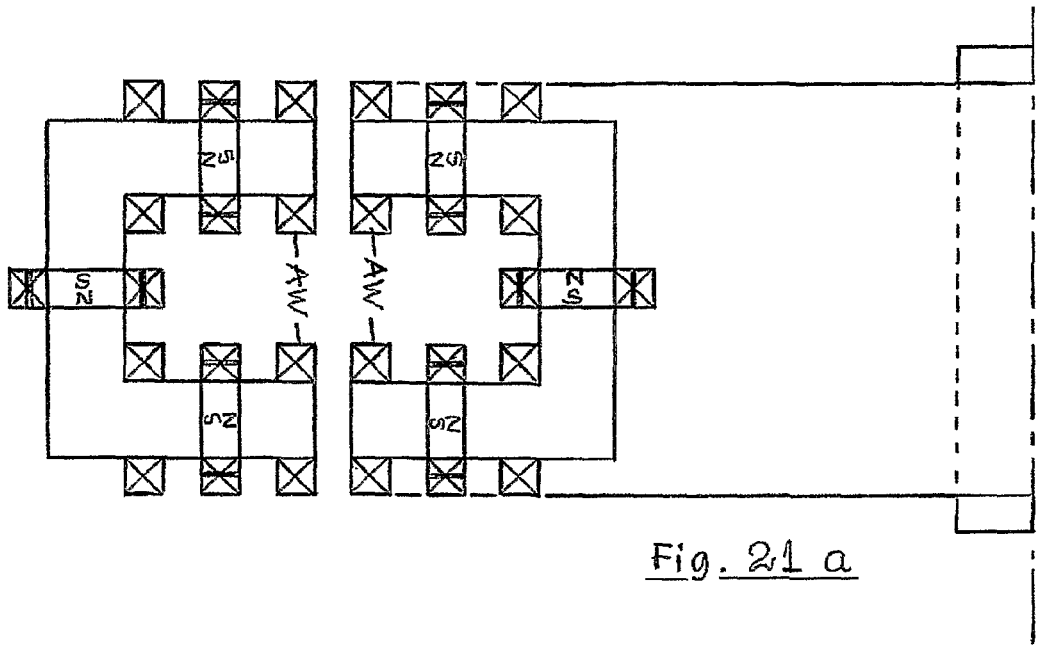
Fig. 21 a
Fig. 21 b
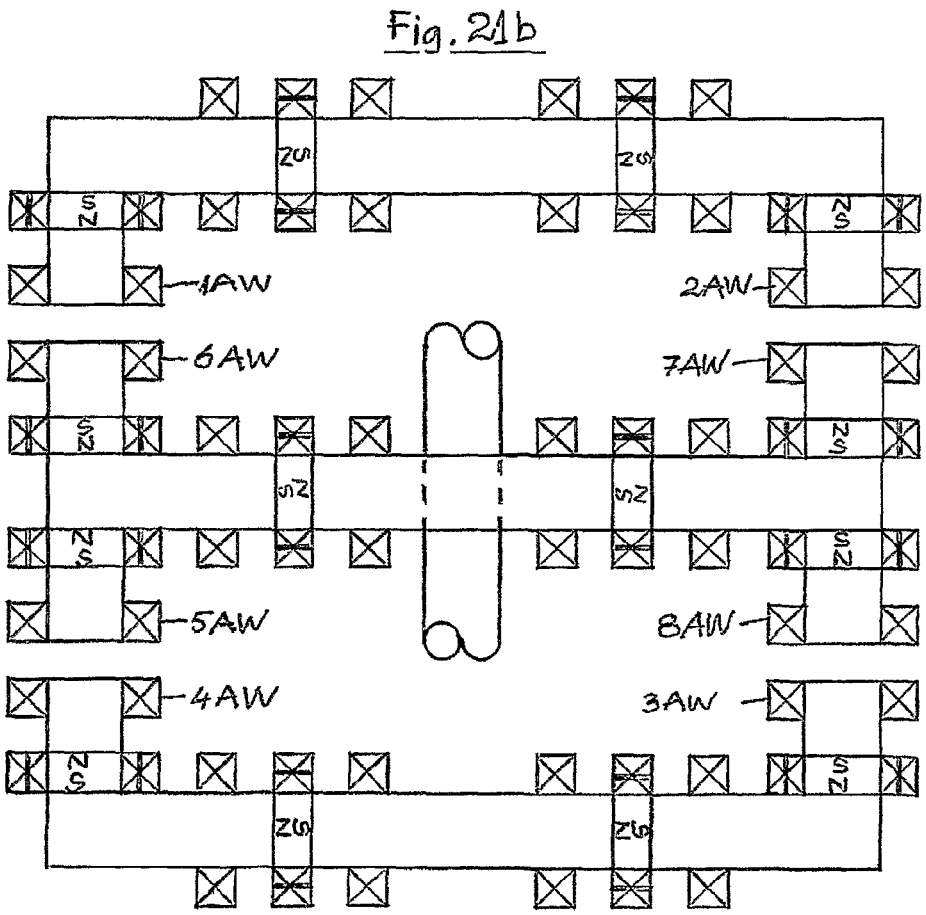

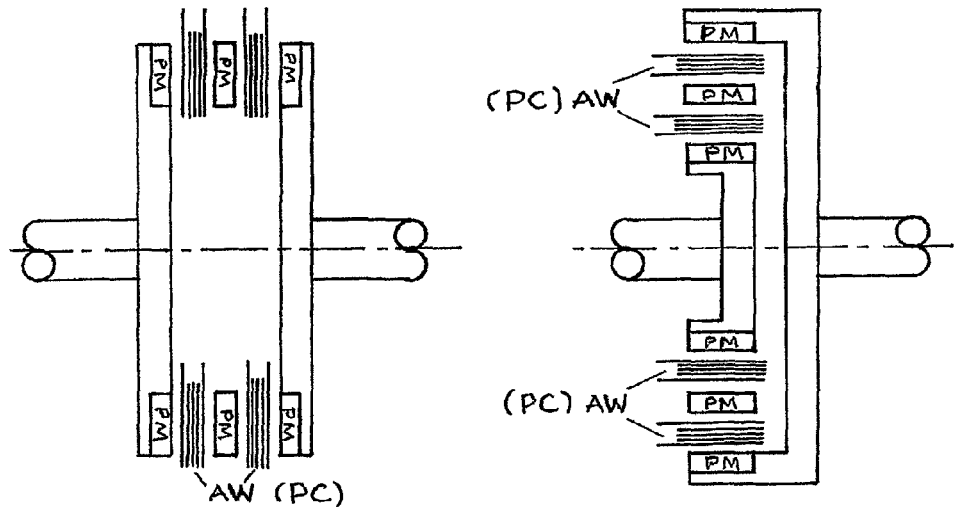
Fig. 22
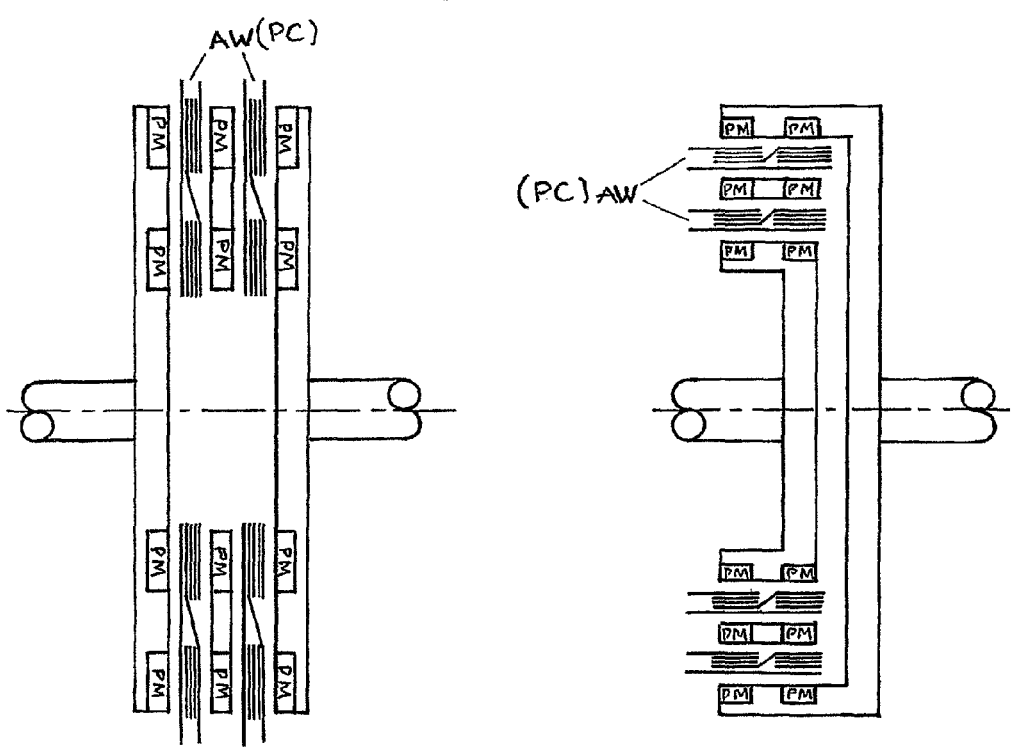

PRINCIPLES OF THE TRAN-ENERGY MACHINES

The present invention relates to principles of the Tran-energy machines, those can be divided into four main sorts:
The first produces electric energy and kinetic energy.
The second produces electric energy.
The third produces electric energy and inductive heating.
The fourth produces electric energy and magnetic pulses.
All four main sorts can operate independently from each other.

The working principles of the Tran-energy machines are based on:
Characters of magnetic flux lines.
Interactions of magnetic fields from different magnetic sources.
Coils and functions.
Switching ON/OFF, timing and functions.
Surplus regaining electric energy.

Four different utilizations of the results from the interactions of magnetic fields and forms of constructions make the four main sorts of the Tran-energy machines.

Principles of the Tran-energy machines are new methods of using:
The energy stored in the permanent magnets.
Magnetic interactions of different magnetic fields, combined with timing switching and electronic components in electric circuit(s) in order to:
Produce the free-magnetic force for higher coefficient of performance in producing kinetic energy.
Produce the induced voltages in different coils on the magnetic circuit(s) or coils along the permanent magnet(s) with separated cores.
Regain electric energy, supplied to the activated coils.
Regain electric energy when the total magnetic flux in the activated coils is collapsed.
Regain electric energy by means of the rising of magnetic flux lines of the permanent magnet(s), inserted in the core.
Obtain electric energy when decelerating the speed of the machines.
Obtain electric energy by addition of the principle of electric transformer on the activated coils.
Make the rotary (moving) parts of the Tran-energy machines produce electric energy for the benefits of electrical tools, installed on these rotary (moving) parts.
Make the inductive heating, for example, in the bearing(s).
Generate the moving magnetic pulses and/or manipulate the poles of the moving magnetic pulses.
Accelerate/decelerate the speed of the ejected ions in the moving magnetic pulses, also as to shift the directions of ejected ions.
Make the electric permanent-magnet generators produce the same electric energy with lower tractive power.

The above-mentioned principles are also value for the Tran-energy machines without permanent magnet(s) in the core(s) of the magnetic circuit(s). FIG. 1a; 1b show the simple forms of magnetic circuits (cores).

In order to maintain a magnetic flux 1Φ, flowing through the core(s) (FIG. 1c; 1d) an electric energy source has to be applied to the coils (FIG. 1e; 1f).
Thus:
Inserting one or more permanent magnets in the core (provided that the magnetic flux lines are under the level of magnetic saturation of this material) is the (first) advantageous acquisition of electric energy.

Moreover, the free-magnetic repulsive force(s) (like poles repel) and the stronger attractive force(s) are not included here. Therefore, the following descriptions are meant for the magnetic circuit(s) with inserted permanent magnet(s) (unless mentioned).

Characters of Magnetic Flux Lines.

All characters of magnetic flux, specially the following: The magnetic flux lines always choose the most suitable magnetic path(s) through any medium in order to complete (a) closed loop(s) immediately.

Interactions of Magnetic Fields from Different Magnetic Sources.

The fundamental magnetic interactions are:
Like poles repel (resulting in repulsive forces).
Unlike poles attract (resulting in attractive forces).

The magnetic interactions in the Tran-energy machines cause:
Not only forces (repulsive force, attractive force), which magnitudes can be calculated by, for example, application of the Coulomb's Law for two magnet poles:

$$F = \frac{\Phi_1 \cdot \Phi_2}{4\pi\mu d^2}$$

where:
F: force (in Newton).
$\Phi_1$, $\Phi_2$: magnetic flux of two confronted fields (in Webers).
$\mu$: the magnetic permeability of the intervening, in free space:

$$\mu = \mu_0 = 4\mu \cdot 10^{-7} T\frac{m}{A}.$$

d: distance of pole faces (in meters).
But also the rates of changes of magnetic flux in two or more different parts of the magnetic path of the whole magnetic circuit. Because the normal flowing of the magnetic flux from permanent magnet source is blocked by the other magnetic field from electric source (duration of magnetic blockade is maximum five times of the time-constant of the coil that causes the magnetic blockade with the aid of electric-pulse energy). Therefore as results of Faraday's Law, inductive voltage(s) e are produced by coils where the magnetic flux Φ, enclosed by it, change:

$$e = \frac{Nd\Phi}{dt}$$

where:
e: inductive voltage (in Volts).
N: turns of coil.

$$\frac{d\Phi}{dt}:$$

the rate of change of magnetic flux.

3

(The Lenz's Law determines the directions of these voltages as well as currents).

BRIEF DESCRIPTION OF THE DRAWING:

FIGS. 1a, 1b, 1c and 1d show the simple forms of magnetic circuits (cores) and a magnetic flux flowing through the core(s) and FIGS. 1e and 1f show an electric energy source applied to the coils.

FIG. 20 shows the plan and side views of an X-form core as stator of the machine with the rotor including permanent magnets with sequential alternating pole-faces.

FIGS. 21a and 21b show the rotary part of the Tran energy machines including magnetic circuits with one or more permanent magnets. inductive and activated coils, installed in the rotor suitable for generating electric energy.

DESCRIPTION OF THE PREFERRED EMBODIMENTS:

In the Tran-energy machines of the first sort, both of the free-magnetic forces, attractive and repulsive force, are utilized, as follow:

First, free-magnetic attractive force, after that a magnetic field of a magnetic circuit with electric current source, causes a repulsive force (FIG. 2a; 2b; 2c; 2d) and simultaneously a magnetic blockade.

Figure 3A:
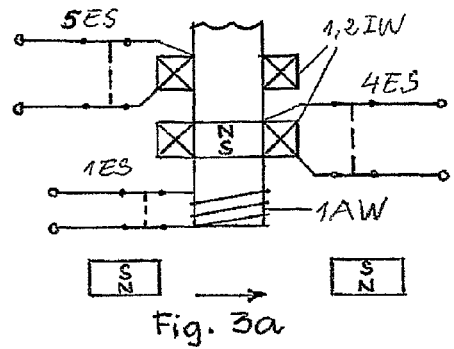
FIGS. 3a, 3b, 3c and 3d show a magnetic circuit with an electric current source providing a magnetic field causing an attractive force and simultaneously a magnetic blockade, after that a free-magnetic repulsive force.

Or:

First, a magnetic field of a magnetic circuit with electric current source, causes an attractive force, simultaneously a magnetic blockade, after that free-magnetic repulsive force or reversibly (FIG. 3a; 3b; 3c; 3d).

This is suitable only for the Tran-energy machines of the first sort (producing electric energy and kinetic energy).

From FIG. 1 to FIG. 22, the following symbols denote:

 Permanent magnet with N: North pole, S: South pole.

 Electric coil that by means of electric energy pulses, activates the magnetic flux changes in magnetic circuit with permanent magnet source(s).

 Direction of moving permanent magnets.

 Coil (inductive/activated).

 Inductive coil with separated core along the permanent magnet.

N Moving permanent magnet with North pole above.
S Moving permanent magnet with South pole above.

 Beginning time of electric energy, supplied to the coil in order to activate the magnetic interactions with the other (moving) magnetic fields.

 (Reckoning with the time-constant).

 End of time of electric energy, the magnetic field from the electric energy pulse begins to decrease.

 (Reckoning with the time-constant).

1AW; 2AW; . . . Activated coil 1; 2; . . . .
11W; 21W; . . . Inductive coils 1; 2; . . . .
1SW; 2SW; . . . Secondary windings, wrapped around the activated coil.
1ES; 2ES (Electronic) switches 1; 2; of the activated coil.
1ES1; 1ES2; . . . (Electronic) switches 1ES1; 1ES2; . . . for obtaining electric energy when the machines are decelerating, or when the machines use the free-magnetic forces.
3ES (Electronic) switches of the secondary winding, wrapped around the (primary winding of) activated coil.
4ES; 5ES; . . . (Electronic) switches 4; 5; . . . of the inductive coils on the path of the magnetic circuit.
1EL; 2EL; . . . Electric loads 1; 2; . . . .
1AG; 2AG; . . . Air-gap(s).
1VR; 2VR; . . . Voltage regulators 1; 2; . . . .
1R; 2R; . . . Rectifiers 1; 2; . . .
1D; 2D; . . . Diodes 1; 2; . . . .
1Φ (total) normal (existed) magnetic flux from permanent magnet inserted in the magnetic circuit.
2Φa (total) magnetic field of activated coils.
3Φ (total) magnetic field of moving permanent magnet.
1HA; 2HA; . . . Permanent magnets in Halbach array(s).
1PC; 2PC; . . . Planar (spiral, helical) concentric coils.

1C; 2C; . . . 1 carrier; 2 carrier of longitudinally guided propulsion and lateral levitation.

FIG. (2a; 2b; 2c; 2d) show the process of magnetic interactions in the Tran-energy machines of the first sort (producing electric energy and kinetic energy). (Assumed that machines are on standard operation).

Figure 2A:
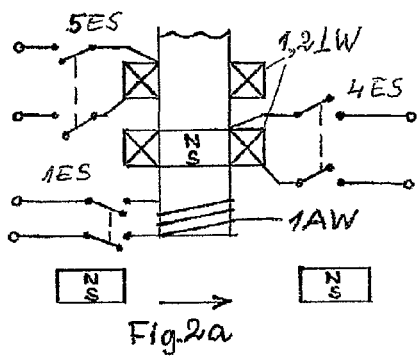
FIGS. 2a, 2b, 2c and 2d show a magnetic circuit with an electric current source providing a magnetic field causing a free-magnetic attractive force and after that a magnetic field causing a repulsive force and simultaneously a magnetic blockade.

FIG. 2a shows unlike pole attraction (free-magnetic attractive force), the moving permanent magnet rushes to the air-gap. During that moment, all switches are OFF.

Figure 2B:
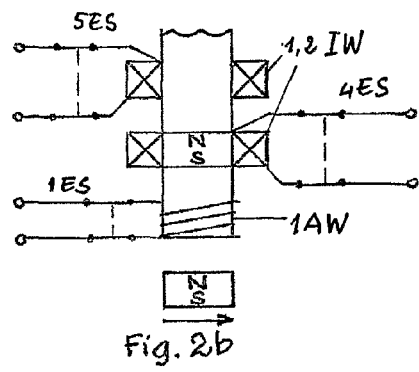
Figure 3B:
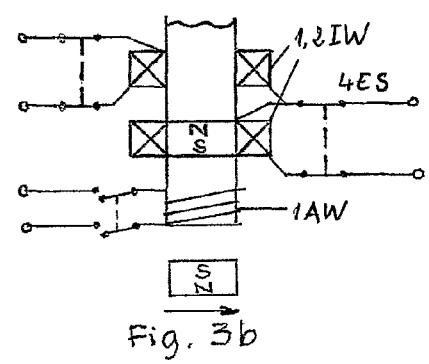

FIG. 2b: At the optimal timing (duration of electric pulse should not be longer than five times of the time-constant of the activated coil), the activated coil turns the energy of electric pulse into a time-changing magnetic flux lines (all switches are ON) that:
  repels the magnetic field of the moving permanent magnet away from the air-gap.
  blocks the normal flow of magnetic flux lines of the permanent magnet inserted in the core of this magnetic circuit, these magnetic flux lines have to make a short loop in the air, around the permanent magnet source.

Figure 2C:
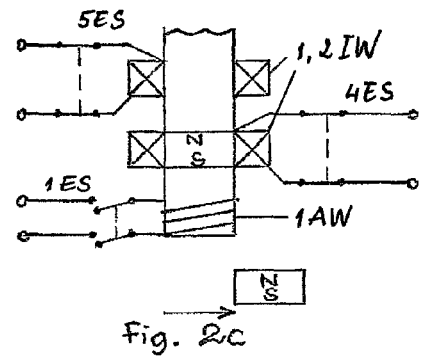
Figure 3C:
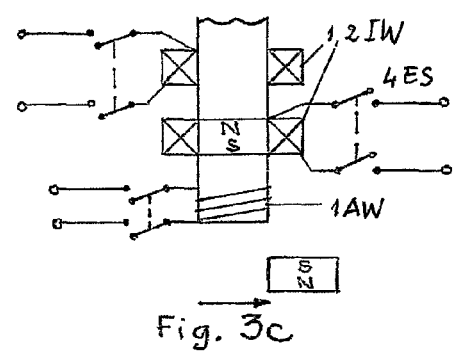

FIG. 2c: the moving permanent magnet is in the same direction of the continuous moving, away from the air-gap, switch 1ES of the activated coil is OFF, while all switches of the inductive coils are still ON, until no more time-changing magnetic flux in these inductive coils.

Figure 2D:
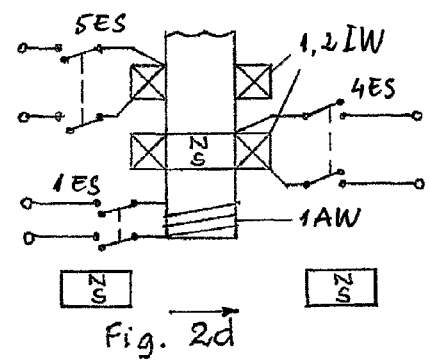
Figure 3D:
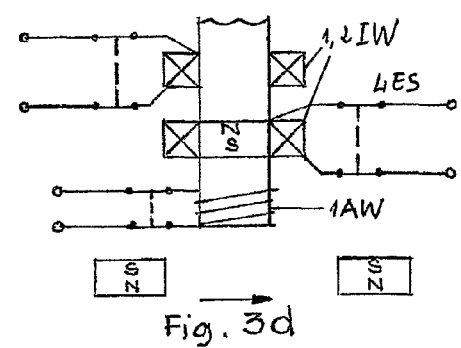

FIG. 2d: the magnetic interaction keeps repeating, all switches are OFF.

For the other sorts of the Tran-energy machines, the repulsive force means the blockade of the normal magnetic flux lines, and when the blockade is removed (after disconnection of electric current to the activated coil), the free attractive force is the automatic return of the magnetic flux lines to flow normally in the core.

FIG. 3a, 3b, 3c, 3d show the other case of the process of magnetic interactions. First the activated coil changes (in a time not longer than five times of the time-constant) the energy of the electric pulse into an unlike magnetic field with regard to the magnetic field of the moving permanent magnet in order to attract it towards the air-gap, simultaneously there is a magnetic blockade in its magnetic circuit.

At the optimal timing, the activated coil is disconnected to the electric energy source, the movement is continuously owing to the free-magnetic repulsive force (like poles repel). All switches are in OFF-stand when utilizing the free-magnetic repulsive force.

Figure 4A:
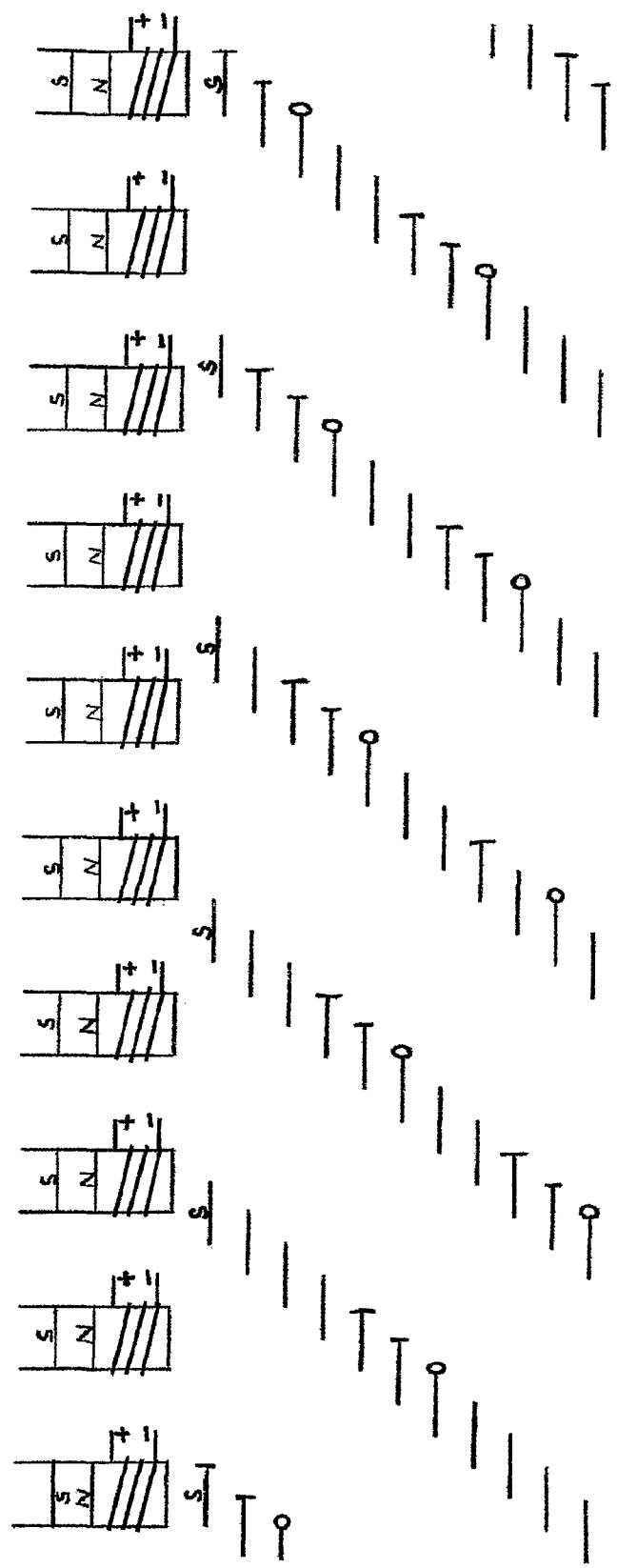
FIGS. 4a, 4b and 4c show different situations of stationary magnetic circuits (electromagnets with inserted permanent magnet(s) and extra inductive coil(s)) and the different arrangements of the moving permanent magnets.
Figure 4B:
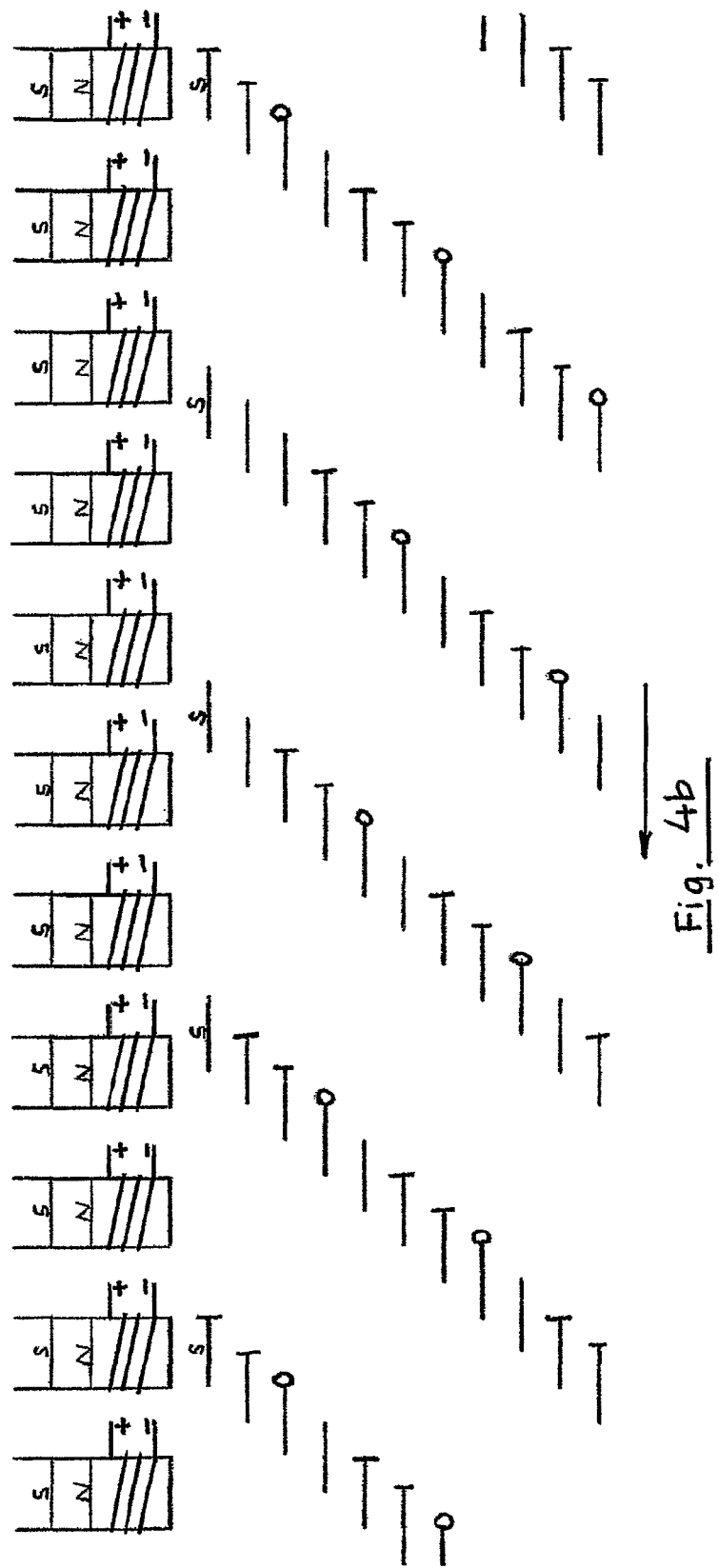
Figure 4C:
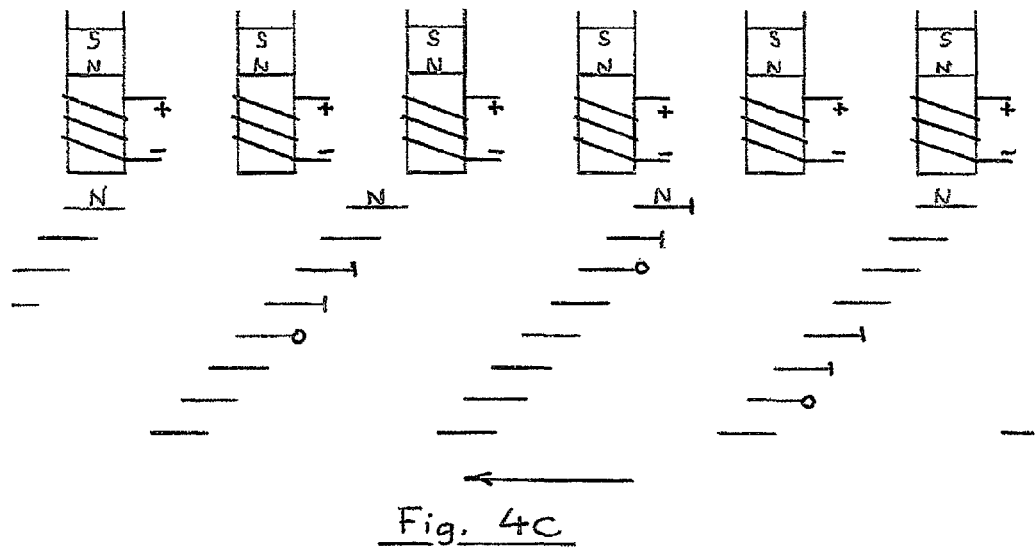

FIG. 4a; 4b; 4c show the other different situations of stationary magnetic circuits (electromagnets with inserted permanent magnet(s) and extra inductive coil(s) also as the different arrangements of the moving permanent magnets.

Figure 4D:
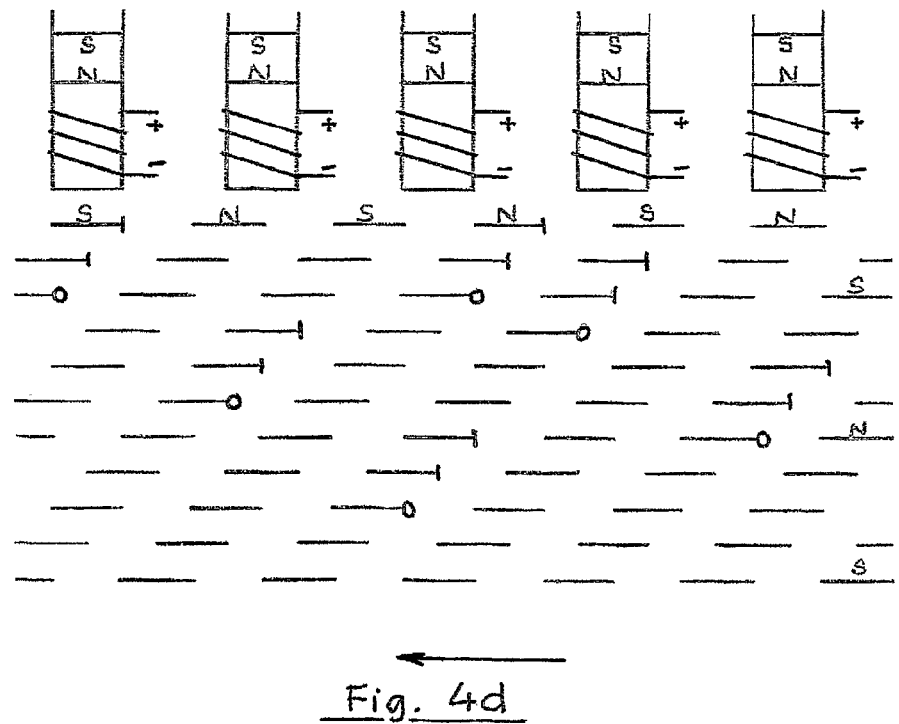
FIG. 4d shows the unchanged pole-faces of the permanent magnets inserted in the stationary magnetic circuit while the pole-faces of the moving permanent magnets are sequentially alternating.

FIG. 4d shows the unchanged pole-faces of the permanent magnets, inserted in the stationary magnetic circuit, while the pole-faces of the moving permanent magnets are sequential alternating. This model needs an accurate positioning for switching ON/OFF of the activated coils and other inductive coils of this magnetic circuit.

Figure 5A:
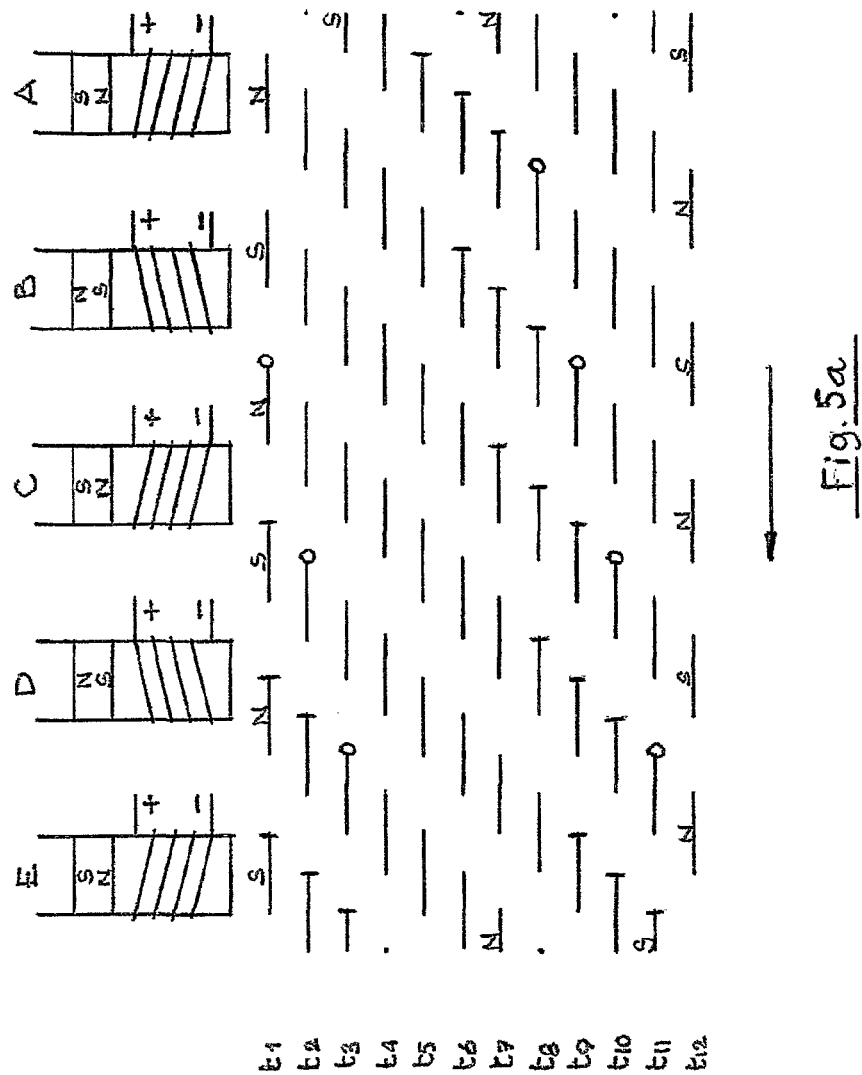
FIGS. 5a and 5b show situations in which all the pole-faces of all the permanent magnets are sequentially alternating.
Figure 5B:
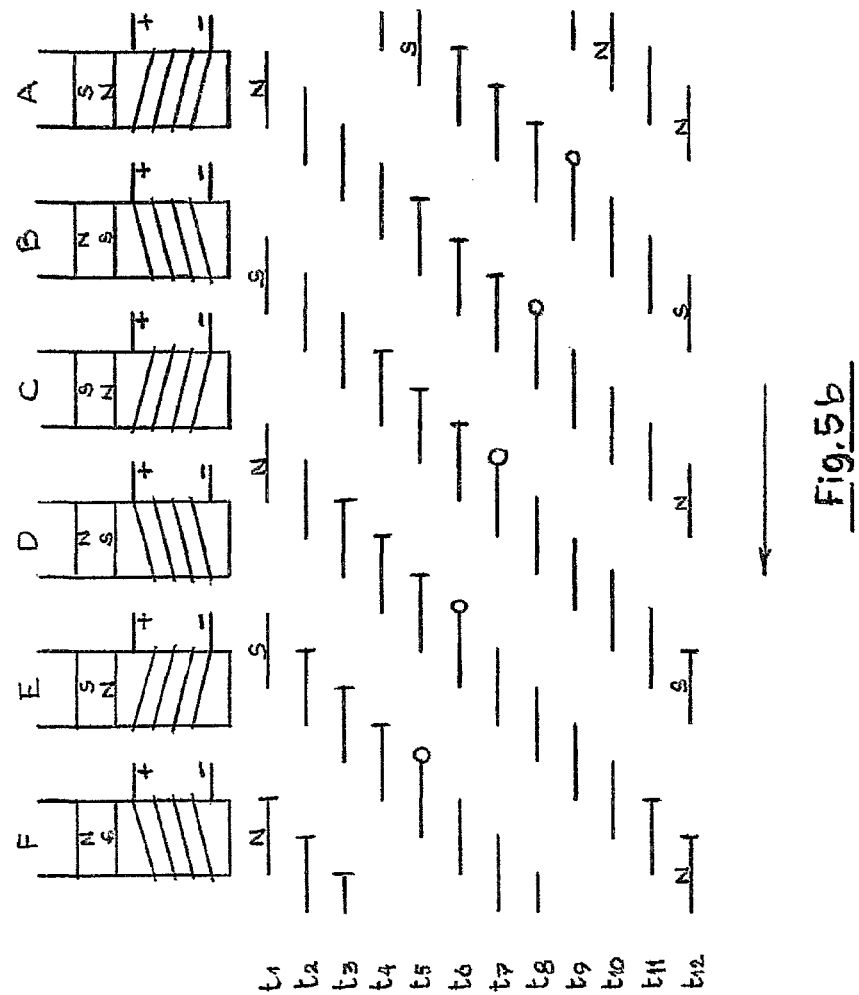

In FIG. 5a; 5b all the pole-faces of all permanent magnets are sequential alternating. With these arrangements and positioning of the magnetic circuits (stationary and movable), the energy of electric pulses, thanks to the activated coils, is in almost at the same time good for three functions:
  Attracting the one moving permanent magnet.
  Repelling the other moving permanent magnet or vice versa.
  Blocking the normal magnetic flux (1Φ) of the permanent magnet, inserted in this magnetic circuit.

In these constructions, the free-magnetic forces also attract the one and repel the other moving permanent magnet nearly at the same time.

For a 100% of transitionary movement of moving permanent magnets (see FIG. 5a; 5b), then more than 50% of this movement is thanks to the free-magnetic forces.

When the free-magnetic forces (attractive and/or repulsive forces) are utilized to produce kinetic energy, then there is no inductive current at all, flowing in all coils of these magnetic circuits. This is achievable by means of:

At least two (electronic) switches, installed at the suitable places of the activated coils (FIG. 6a; 6b), are in OFF-stand. The switches 1ES; 2ES in OFF-stand prevent the inductive electric current flowing in the activated coils as in the electric circuit related to the coils (provided that the source of electric voltage is always higher than inductive voltage in the activated coils).

Figure 6A:
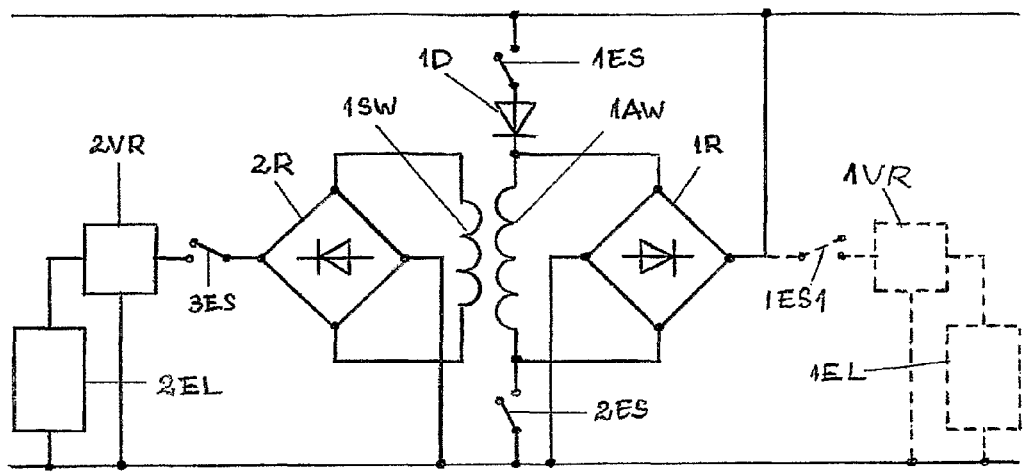
FIGS. 6a, 6b, 6c. 6d, 6e and 6f show two or more (electronic) switches installed at suitable places of the activated coils.

And at least one switch is in OFF-stand for the other inductive coils and secondary winding wrapped around the activated coil of this magnetic circuit. In FIG. 6a; 6b switch 3ES of the secondary winding 1SW, and in FIG. 6c switch 4ES of the inductive coil 1IW are OFF.

The dotted lines in FIG. 6a; 6b shows the other way to regain electric energy for the electric load (1EL, FIG. 6a; 6b), or another battery (FIG. 6d) in place of returning the electric energy to the battery-source.

In case of need (FIG. 6d; 6e; 6f) the extra switches 2ES1; 3ES1; 4ES1 are in the same OFF-stands with switches 1ES; 2ES; 3ES; 4ES (as all are in the same ON-stands in case of need), in order to make sure that there is no inductive current at all, flowing in these coils when utilizing the free-magnetic forces.

In all figures the symbol IW denotes the inductive coils.

Briefly, except the magnetic forces, the magnetic interactions in the Tran-energy machines magnetically cause:

A time-changing magnetic flux $$\frac{d(1\Phi)}{dt}$$

in the inductive coils, and in the surroundings of this permanent magnet.

Accordingly when switch 4ES is ON (FIG. 6c) an inductive current flows in the electric circuit of this coil.

Also a time-changing magnetic flux in the activated coil (the sizes of the rates of changes of magnetic flux in the core of the activated coils, depends on the situations of each magnetic circuit), therefore a secondary winding can be wrapped around the activated coils to generate the extra inductive voltage (see FIG. 6a; 6b; 6d; 6e).

Figure 7A:
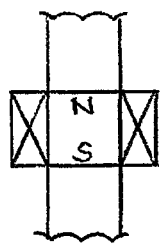
FIGS. 7a and 7b show the inductive coil wrapped around the permanent magnet and FIGS. 7c and 7d show the inductive coil wrapped around the separated cores along the permanent magnet.
Figure 7B:
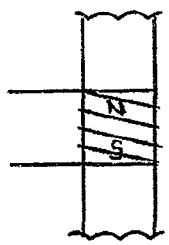
Figure 7C:
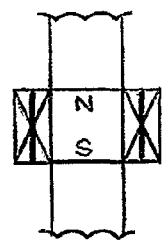
Figure 7D:
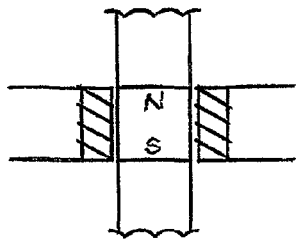

When the magnetic flux of the activated coil blocks the normal magnetic flux (1Φ) of the permanent magnet, inserted in this magnetic circuit. These flux lines have to flow in the surroundings of their own permanent magnet. Therefore, this time-changing magnetic field induces a voltage in a coil of wire wrapped around this permanent magnet or around separated cores along this permanent magnet. FIGS. 7a and 7b show the inductive coil wrapped around the permanent magnet and FIGS. 7c and 7d show the inductive coil wrapped around the separated cores along this permanent magnet.

When a D.C voltage is connected to the activated coil, the current increases according to the equation:

$$I = \frac{V}{R}\left(1 - e^{-\frac{t}{\tau}}\right)$$

V: applied D.C. voltage.
R: resistance of windings.
e: Napierian constant (e=2.71828 ... ).

$$\tau = \frac{L}{R}:$$

time constant of the windings.
L: inductance of the windings.
t: duration of time of current in the windings.

When the D.C. voltage is disconnected to the coil, the current decreases according to the equation:

$$I = \frac{V}{R}\left(e^{-\frac{t}{\tau}}\right)$$

Practically when t=5T, the rate of change of magnetic flux in the activated coil:

$$\frac{d(2\Phi a)}{dt} = 0$$

(2Φa: magnetic flux of activated coils).

Coils and Functions
There are two kinds of coils:
Inductive coils and inductive coils with separated cores along the permanent magnet in the magnetic circuit.
Activated coils and activated coils with secondary winding wrapped around this activated coil.
Inductive coils are placed on the path of the magnetic circuit or with separated cores along the permanent magnet where it is suitable for producing the highest (or desired) induced voltages, as result of the magnetic interactions, caused by the activated coils.

Accordingly, induced voltages of the inductive coils are derived from the rate of change of existed magnetic flux $$\frac{\Delta(1\Phi)}{\Delta t}$$

and not from the rate of change of magnetic flux of the activated coils.

The inductive coils can possess separated cores (see denoted symbols), along the permanent magnet(s) because, the magnetic flux lines of the permanent magnets, at that moment of magnetic interactions with the magnetic flux lines from the activated coils, flow in the surrounding air of this permanent magnet.

Inductive coils also take part in reducing the speed of the Tran-energy machines of the first sort, by means of the presence of inductive currents in these inductive coils.

Activated coils and activated coils with secondary winding wrapped around this activated coil.

Thus when the Tran-energy machines are in standard operation, the ON-time of the activated coil(s) should be not longer than five times of the time-constant of the coil(s) (suggested that the duration of the OFF-time is the same).
From t=0 second to t=5τ seconds,
Increasing current:

$$\frac{d(2\Phi a)}{dt} > 0$$

From t=5τ seconds to t=10τ seconds, decreasing current:

$$\frac{d(2\Phi a)}{dt} < 0$$

Suggested that with an electric pulse of a period of five times of its time-constant, the activated coils cause:
a magnetic flux changing two times longer than that period (provided that, duration of decreasing current is also five times of the time-constant).
interactions with the other magnetic fields which are also two times longer than that period.
return of energy from this electric pulse to the battery when its own magnetic field (possibly with the magnetic field of the moving permanent magnet) collapses and the return of energy also comes from the rising of magnetic flux from the permanent magnet, inserted in the magnetic circuit(s) on which the activated coil(s) is (are) installed.

As mentioned above, activated coils (1AW; 2AW) on the magnetic circuit are used to turn the energy of electric pulses into magnetic pulses in order to:
Block the flow of the normal (existed) magnetic flux (1Φ) in this magnetic circuit with permanent magnet source(s) with its own magnetic field (2Φa).
Attach or repel the magnetic fields of the moving permanent magnet(s) (3Φ) to or from the air-gap(s) of this magnetic circuit in the Tran-energy machines to produce kinetic energy.

If there is a secondary winding wrapped around the activated coil, then the inductive voltage is derived from the rates of changes of magnetic flux in the core of these activated coils.

Accordingly, produced kinetic energy and electric energy in the Tran-energy machines of the first sort, are derived from the magnetic interactions of three different magnetic fields, to wit:
Magnetic field (1Φ) from permanent magnet(s) inserted in this magnetic circuit.
Magnetic field (2Φa) of the activated coils.
Magnetic field (3Φ) from the moving permanent magnet(s).

Switching on/Off, Timing and Functions.
Assumed that the Tran-energy machines are in standard operation. In view of the time-constant of the activated coil, the ON-time of switching should be not longer than five times of the time-constant. After that, switching can be ON again when the rate of change of magnetic flux is zero in this activated coil.

For the Tran-energy machines without producing kinetic energy, there are also two switches for each activated coil (provided that the electric conductor of winding is not very long).

Figure 6B:
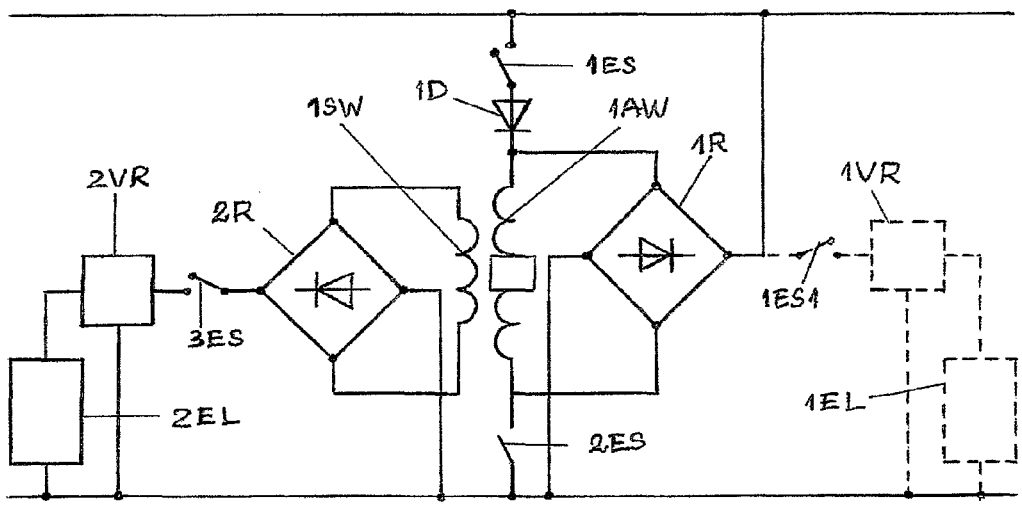

FIGS. 6a and 6b show positions of switches 1ES; 2ES in the electric circuit of an activated coil with and without inserted permanent magnet. The rectifiers 1R; 2R; 3R; . . . and voltage regulators 1VR; 2VR; 3VR; or the controlled rectifiers make the desirable voltages.

The diode 1D prolongs the operation-life of switch 1ES.

Control of timing ON/OFF for those Tran-energy machines—not for the first sort—can be done with the aid of electronics, or computers (for example frequency modulator, pulse width modulator, timer . . . ).

For the Tran-energy machines of the first sort (producing electric energy and kinetic energy), the control of timing ON is for all of coils, related to this magnetic circuit. Because these sorts of the Tran-energy machines utilize the free-magnetic forces of magnetic fields between the stator and the moving permanent magnet(s) (like poles repel, unlike poles attract). Consequently, there is no inductive current at all in the activated coil or in the secondary winding or in the inductive coils.

It means that: During the time of utilizing the free-magnetic forces, all switches of the circuits are OFF, until the position of the moving permanent magnets with regard to the stator (i.e. the activated coils) is in optimal condition for switching.

There are two control-units for the switching of the electric circuit.

One for all coils generating the inductive voltages, but this control unit can be associated with the switches 1ES, 2ES by computerization.

One for the two switches 1ES; 2ES of the activated coil.

For each inductive coil is at least one switch. FIG. 6b; 6c show the possible places of these switches (3ES; 4ES; . . . ).

Switches 3ES; 4ES; . . . are ON at the same time with switches 1ES; 2ES of the activated coil, but are OFF when, for example, there is no more electric current in the inductive coils, or other inductive coils associated with the switches 1ES; 2ES.

ON/OFF switching of the 1ES; 2ES of the activated coil can be done with the help of a positioning sensor (reckoning with the response-time of the sensor and the time-constant of the activated coil).

All switches are better with electronics such as solid-state-relais (SSR), (power) MOSFET's, bipolar transistors, insulated gate bipolar transistors (IGBT), gate turn off thyristor (GTO) . . . than using mechanical or electromechanical relays.

The two switches 1ES; 2ES of the activated coil are OFF in order to:

Return the magnetic energy stored in the activated coil, through the electric circuit to the battery or other purposes, through the related electric circuit (see electric circuits in FIG. 6a; 6b including dotted lines).

Return the magnetic energy stored in the activated coil, when reducing the speed of these machines, also through the related electric circuit (see electric circuit in FIG. 6a; 6b; 6d; 6e).

Prevent the inductive current in the activated coil, when utilizing the free-magnetic forces. Provided that the inductive voltage at that moment of utilizing the free magnetic forces is not higher than the voltage source of the battery.

Furthermore, when reducing the speed of these machines, all switches or partly of the inductive coils, secondary windings are ON (while switches 1ES; 2ES of the activated coils are OFF).

Surplus Regaining Electric Energy.

Assumed that, the duration of time to supply electric energy to the activated coil is not longer than five times of the time-constant, and the increasing or decreasing electric current is linear and equal (in absolute value), then the electric energy can be regained by:

Collapsing of the magnetic flux ($2\Phi a$), or collapsing of total magnetic flux ($2\Phi a$) together with the magnetic flux ($3\Phi$) of the moving permanent magnet(s) and the rising of magnetic flux ($1\Phi$) from permanent magnet(s) inserted in this magnetic circuit. In case of need, a secondary winding 1SW wrapped around the activated coil, generates an induced voltage by means of the rate of change of magnetic flux ($2\Phi a$) from the activated coil.

Moreover, in standard operation, the Tran-energy machines need no cooling system for the activated coils owing to the two switches 1ES; 2ES (in OFF-stand), the diode 1D and the full bridge rectifiers or the controlled rectifiers on the electric circuit.

Figure 6C:
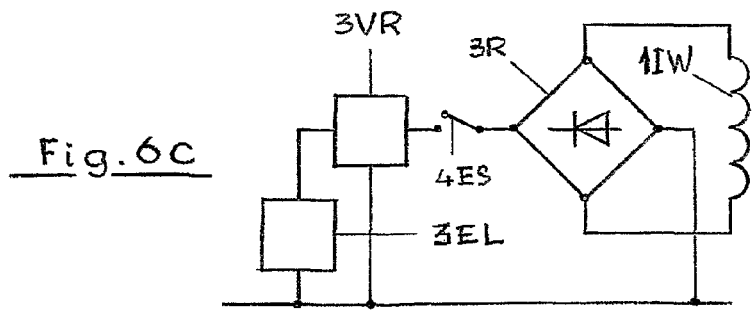
Figure 6D:
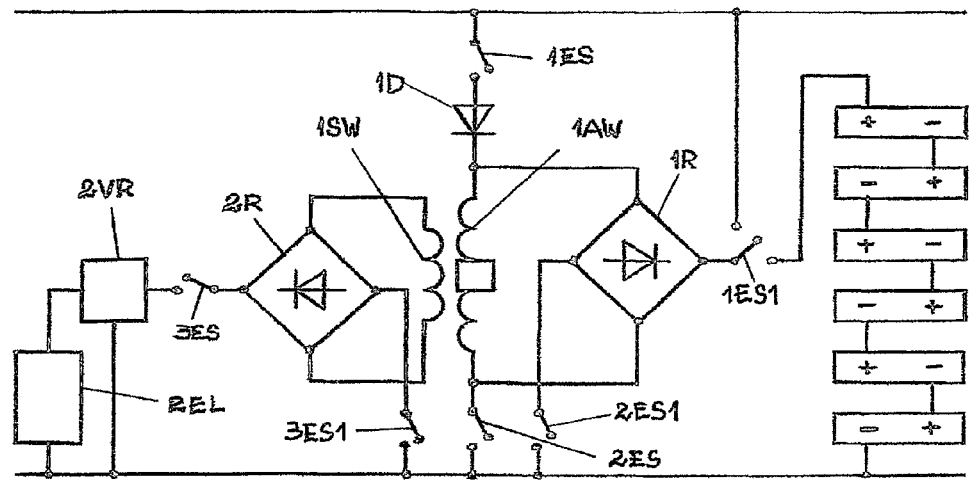
Figure 6E:
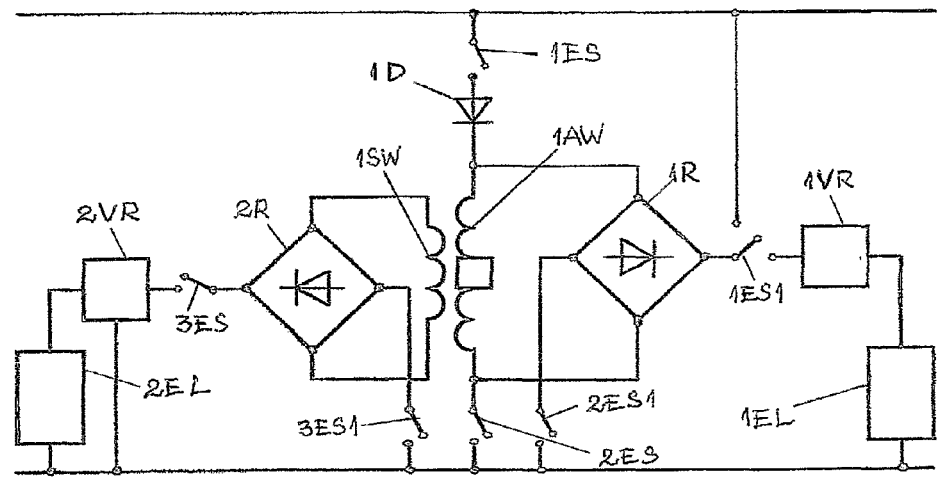
Figure 6F:
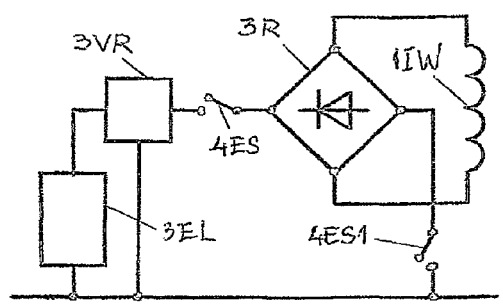

The rates of change of magnetic flux ($1\Phi$) from inserted permanent magnet(s), at the moment of magnetic interactions, via the inductive coils (1IW; 2IW; . . . ) to produce the induced voltages (FIG. 6c; 6f and all figures with inductive coils denoted by IW).

With small air-gaps (1AW, FIG. 9d) in the magnetic circuit(s) the more permanent magnets inserted in the core, (provided that there is no magnetic saturation in the core) the more induced voltages generate from these coils (FIGS. 9d and 9e), owing to the phenomenon that the magnetic flux flows in and out the cores of the magnetic circuit.

For the Tran-energy machines of the first sort, except the advantages of utilizing the free-magnetic forces, the extra regaining electric energy also comes from the reducing speed of the machines through the activated coils (switches 1ES; 2ES=OFF) and inductive coils (switch 4ES=ON) and secondary winding (switch 3ES=ON), at the mean time switch 1ES1=ON to lead the regaining electric energy to the electric load 1EL (FIGS. 6a and 6b).

Figure 8A:
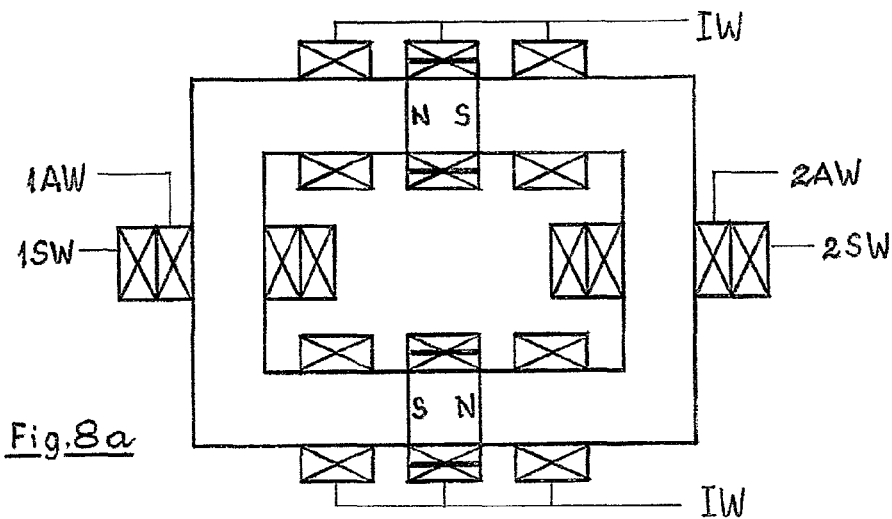
FIGS. 8a-8b, 9a-9e, 10a-10b, 11a-11g and 12a-12g show simple forms of magnetic circuits used in the Tran energy machines of the first and second sort.
Figure 8B:
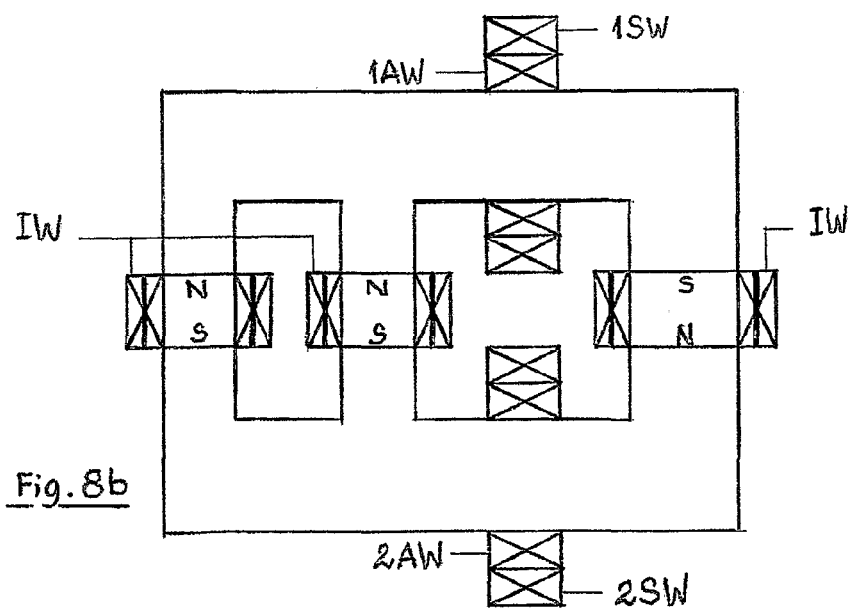
Figures 9A, 9B, 9C:
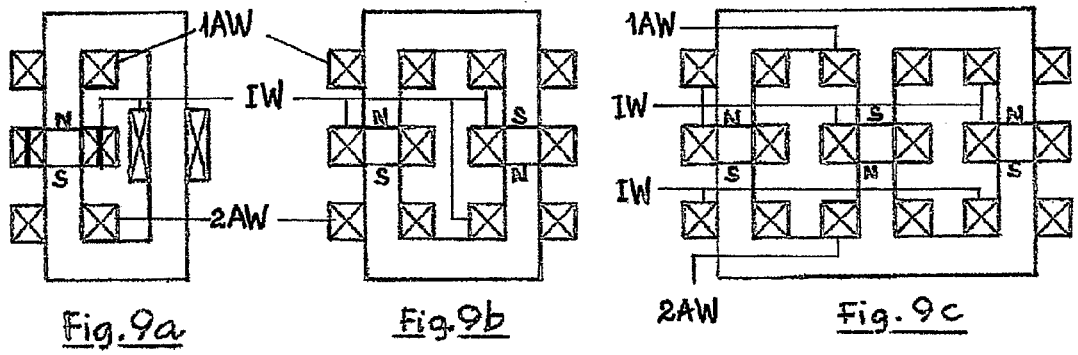
Figure 9D:
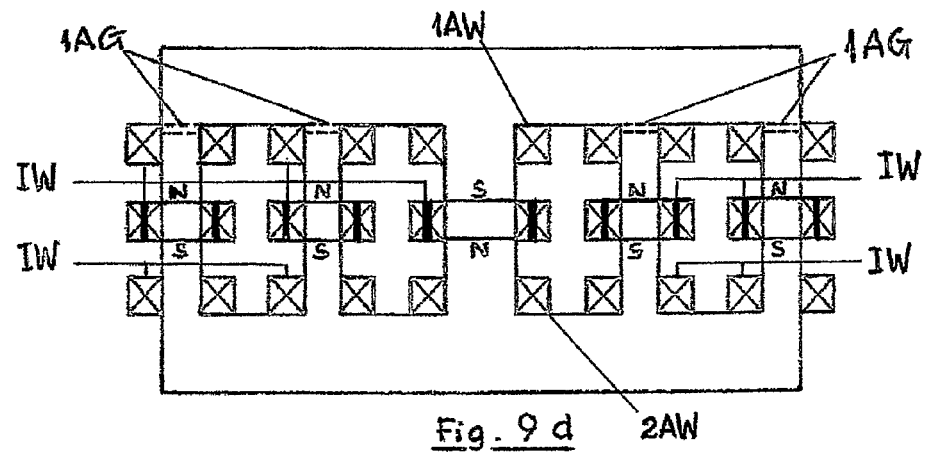
Figure 9E:
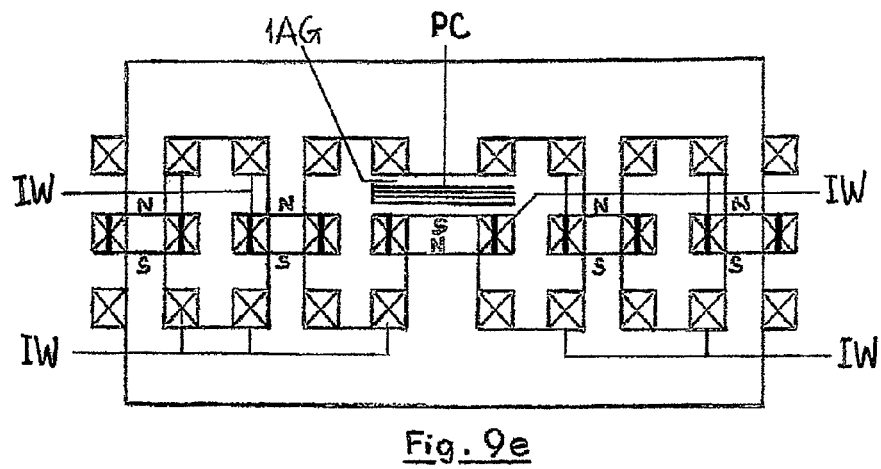
Figure 10A:
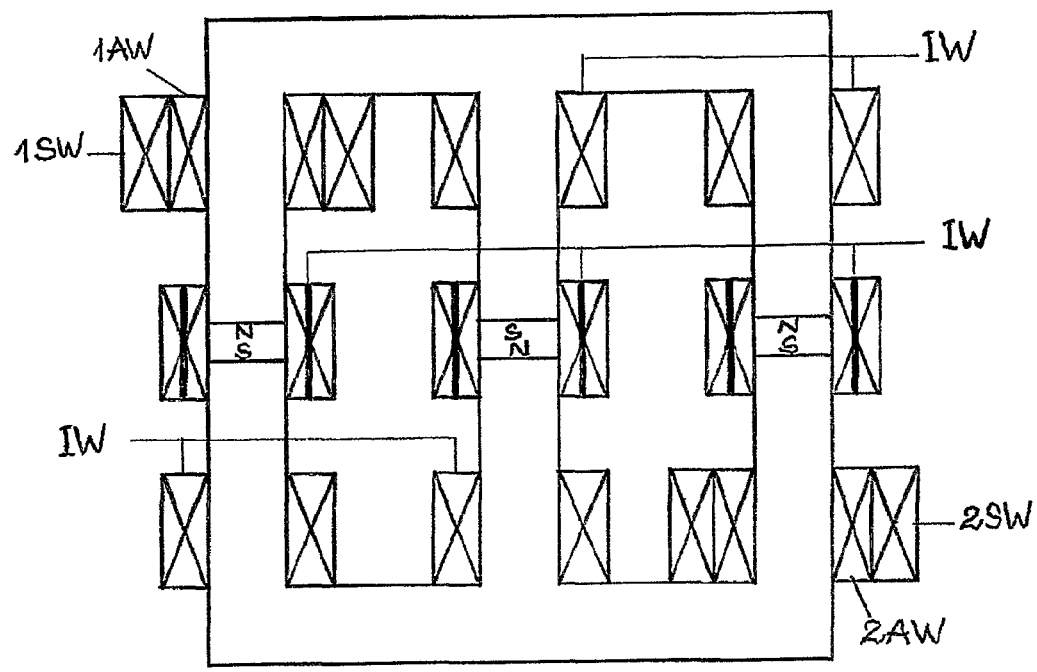
Figure 10B:
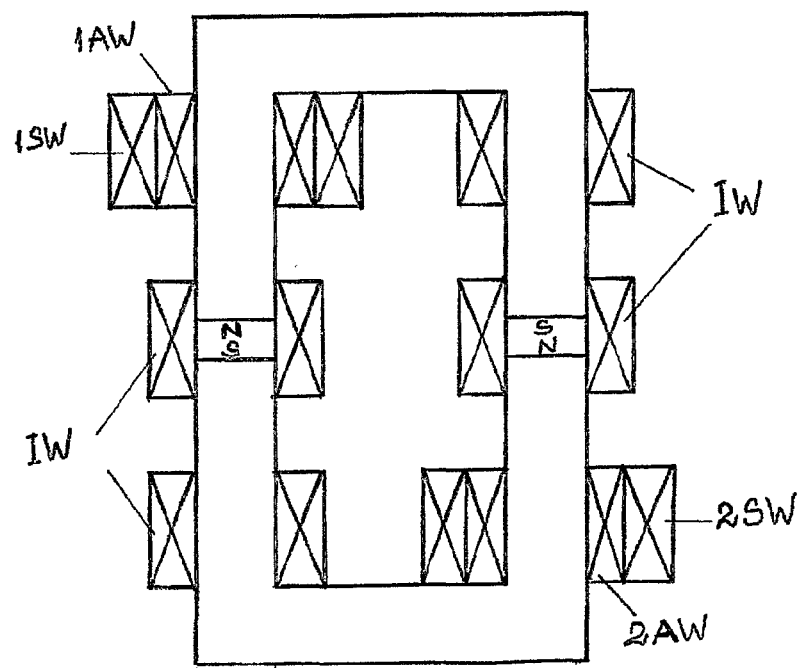
Figures 11A, 11B, 11C:
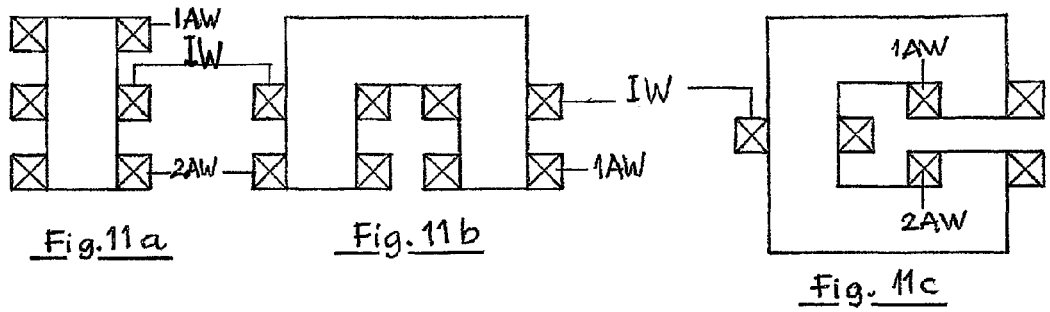
Figures 11D, 11E, 11F:
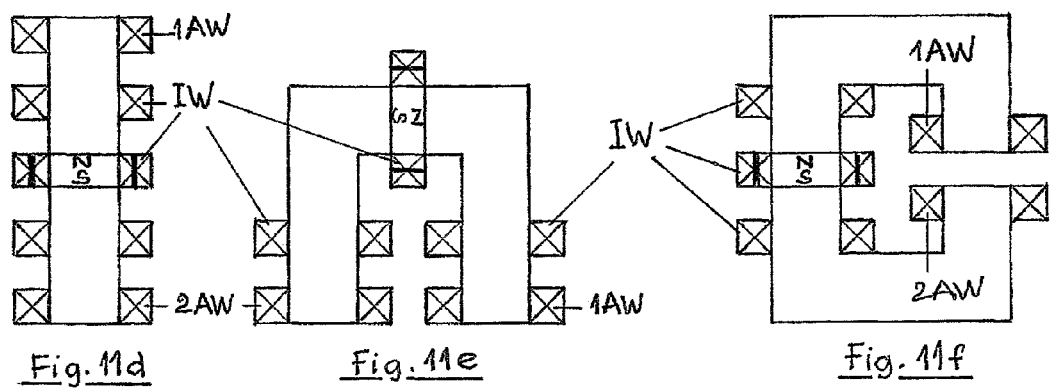
Figure 11G:
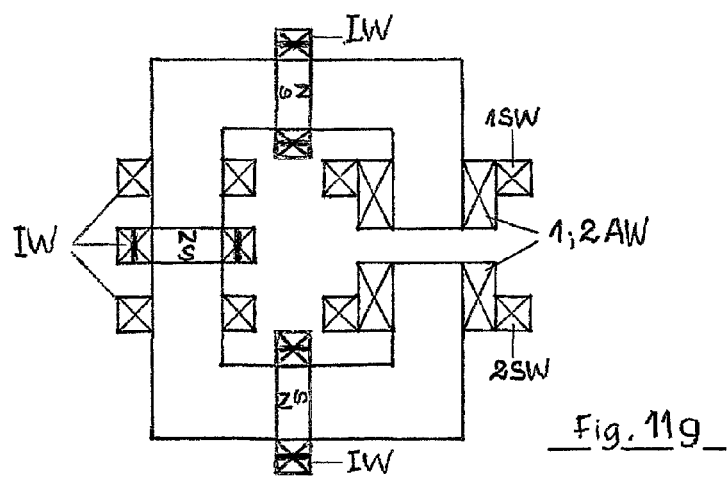
Figure 12A:
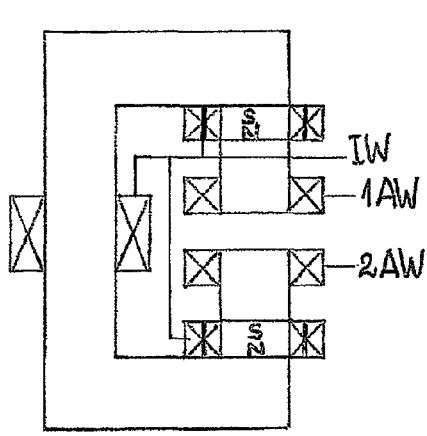
Figure 12B:
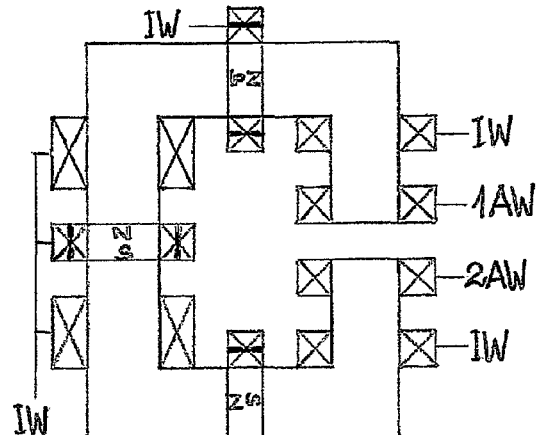
Figure 12C:
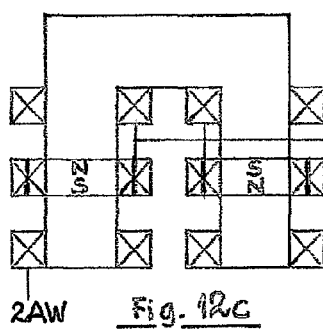
Figure 12D:
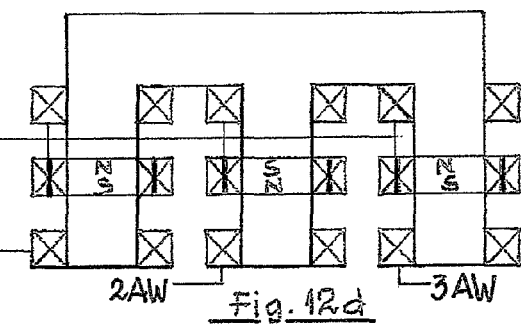
Figure 12E:
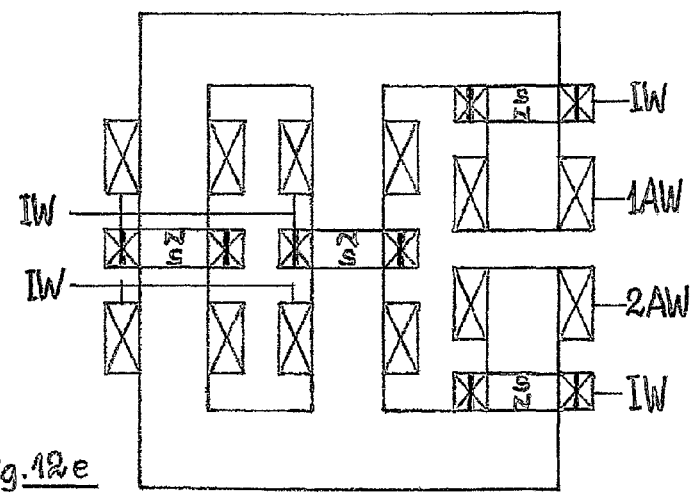
Figure 12F:
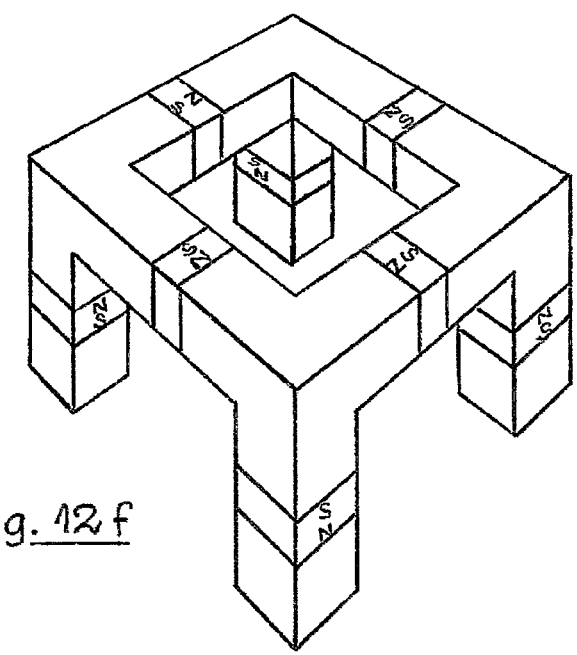
Figure 12G:
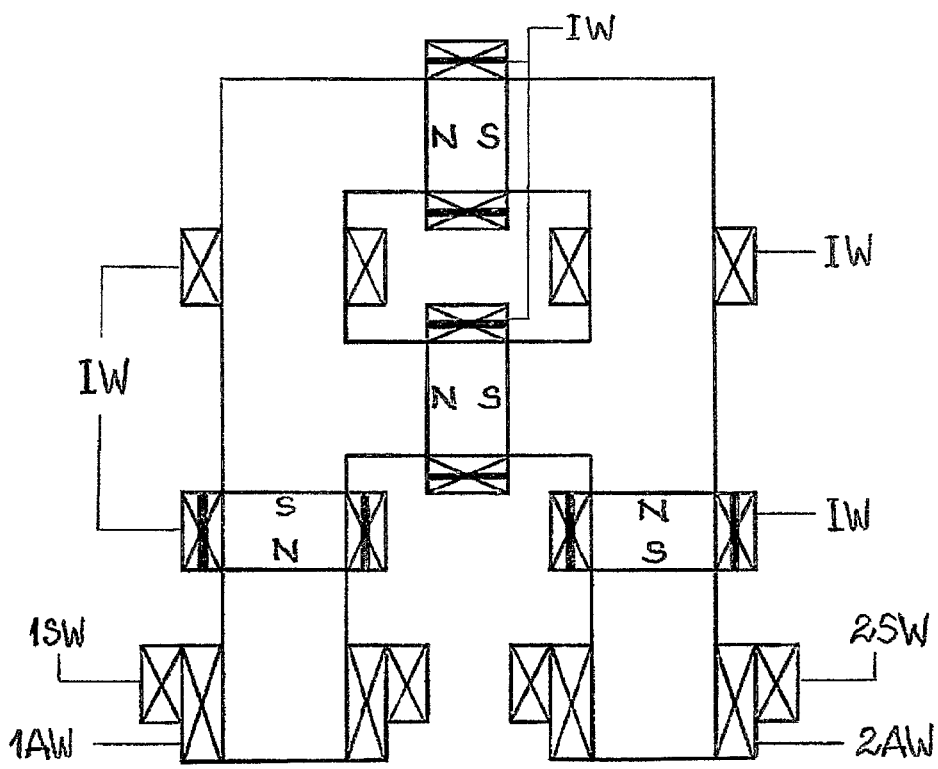
Figure 13:
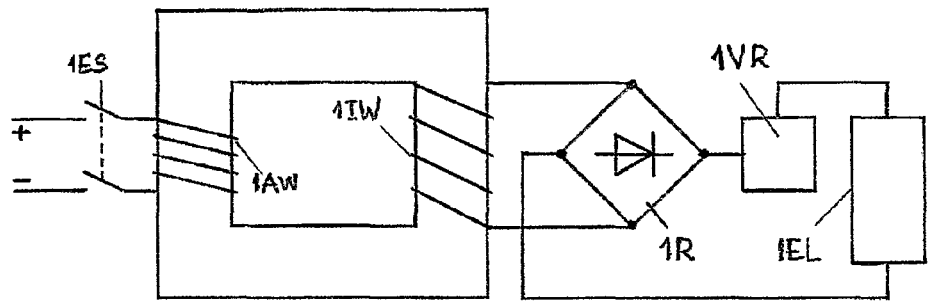
FIG. 13 shows a pulse width modulator that generates an electric pulse in the magnetic circuits without a permanent magnet that is suitable for the Tran energy machines of the second sort (producing electric energy).

FIGS. 8; 9; 10; 11; 12 show the simple forms of magnetic circuits used in the Tran-energy machines of the first and second sort. For the sake of simplicity, no activated coils, no inductive coils are drafted on the core of the magnetic circuit of FIG. 12f. Each permanent magnet inserted in the core is one inductive voltage extra, yielded by the magnetic interactions between the magnetic field of activated coils and magnetic fields of these permanent magnets.

Theoretically the duration of time of these inductive voltages are twice as longer than the time of electric energy supplied to the activated coils, in practice it is often shorter.

For the magnetic circuits without permanent magnet (FIG. 13) a pulse width modulator generates an electric pulse in a period of about five times of the time-constant to the primary (activated) coil. In the secondary coil there is nearly constant and continuous electric current. This circuit is suitable for the Tran-energy machines of the second sort (producing electric energy).

Figure 14A:
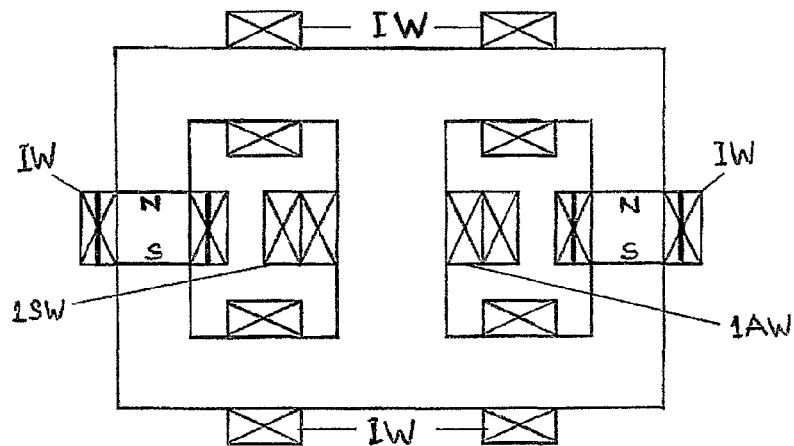
FIGS. 14a and 14b show a combination of alternating current and closed magnetic circuit with a permanent magnet source as is suitable for the Tran energy machines of the second and third sort.
Figure 14B:
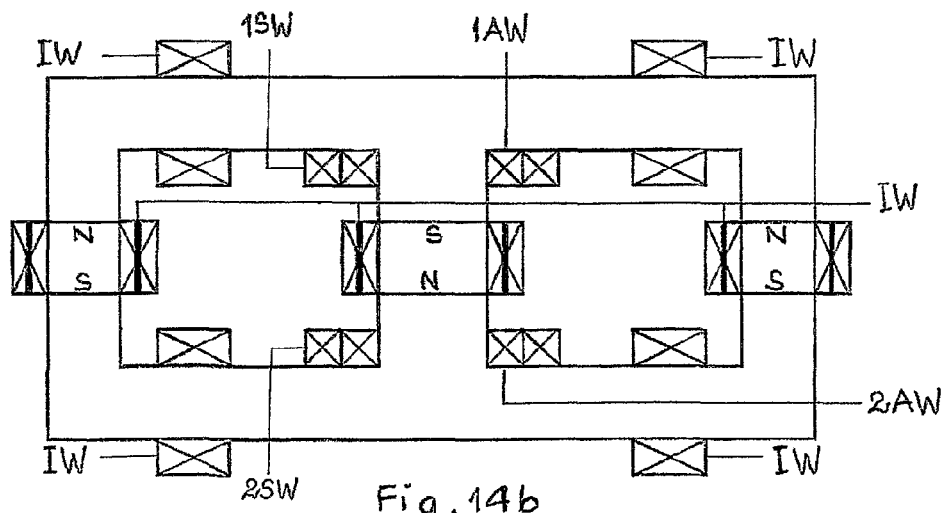

FIG. 14a shows a combination of alternating current and closed magnetic circuit with permanent magnet source (the circuit is suitable for the Tran-energy machines of the second and third sort). An alternating current is applied in the middle part of a magnetic circuit with two parallel permanent magnets (to have more permanent magnets is possible (FIG. 14b), provided that no magnetic saturation in the core).

The activated coil—with a secondary winding wrapped around it—becomes an electric transformer, and at the same time of magnetic interactions, in the other parts of the core the magnetic flux lines of these permanent magnets travel in and out the core. Therefore regulating these inductive voltages is desired, because the absolute value of the rate of change of magnetic flux in this core at that moment is $$\frac{d(2\Phi a + 1\Phi)}{dt}.$$

Regaining electric energy from magnetic interactions of the magnetic circuit with electric current sources (without permanent magnet), is not much. By producing kinetic energy the free-magnetic repulsive force is missed (see FIG. 15a) and the free-magnetic attractive force is smaller than the construction in FIG. 15b.

Figure 15A:
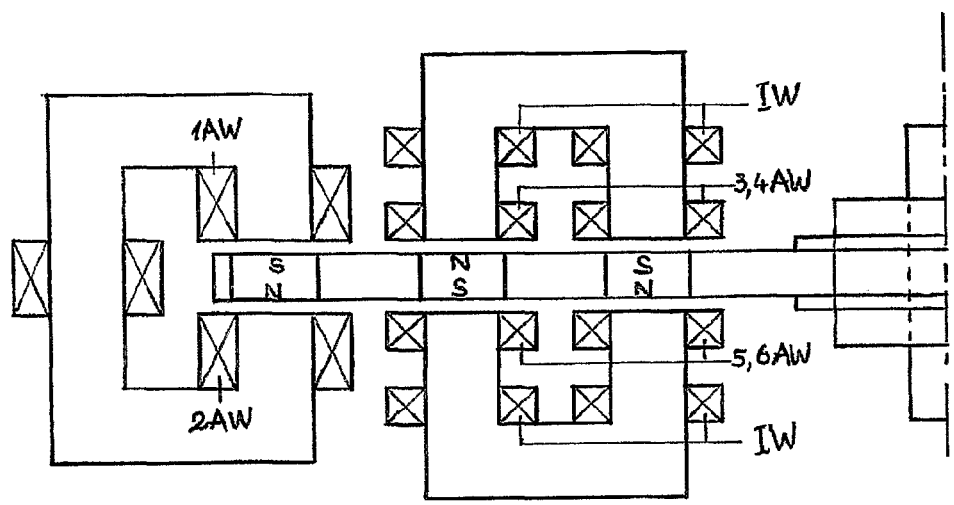
FIGS. 15a, 15b, 15c, 15d, 15e and 15f show the possible constructions of the Tran energy machines of the first sort.
Figure 15B:
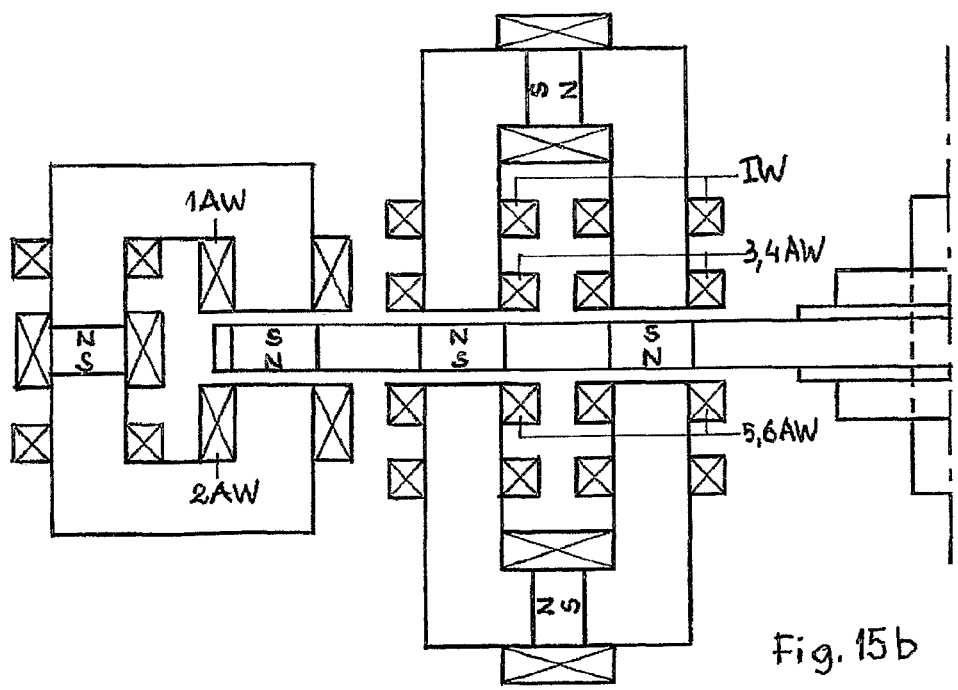
Figure 15C:
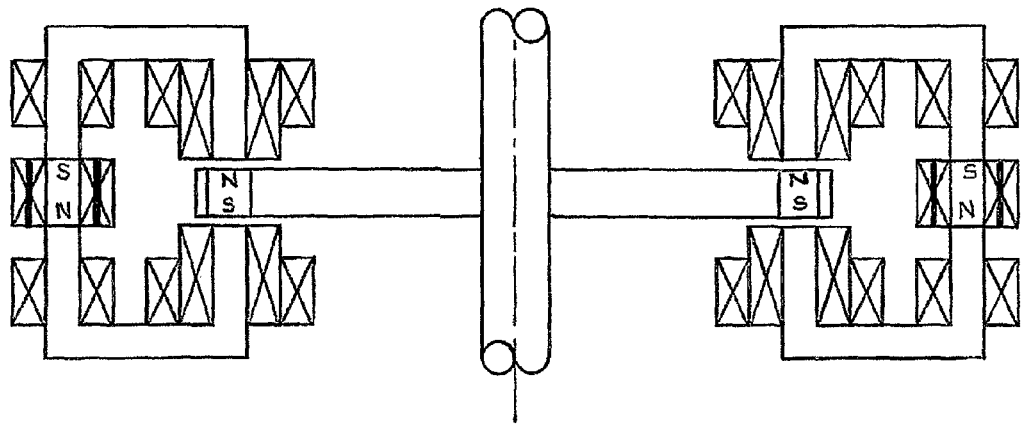
Figure 15D:
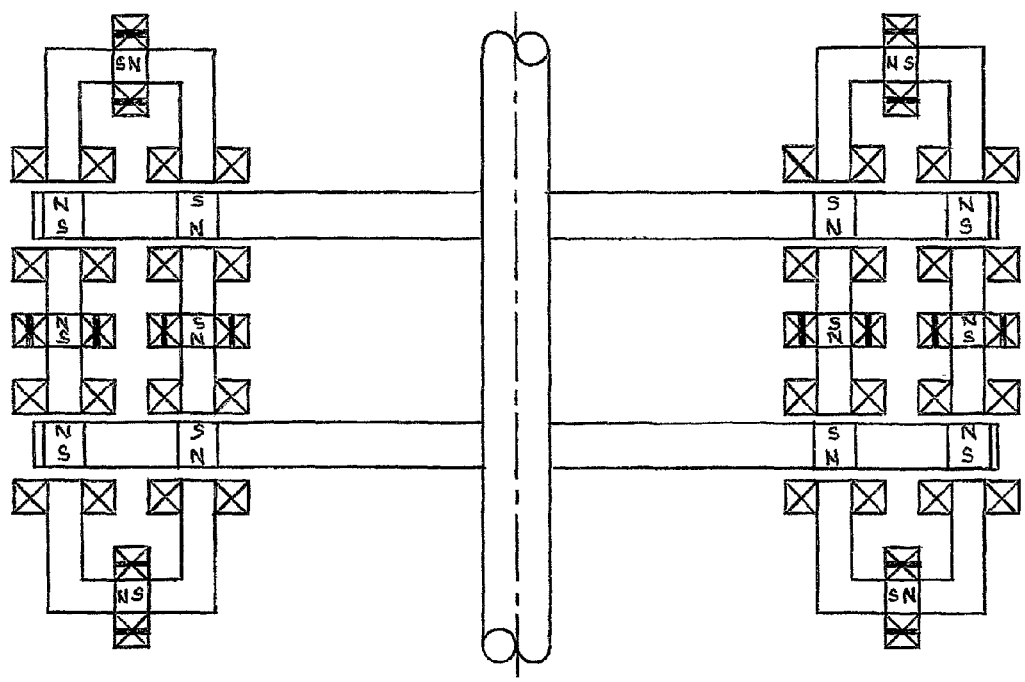
Figure 15E:
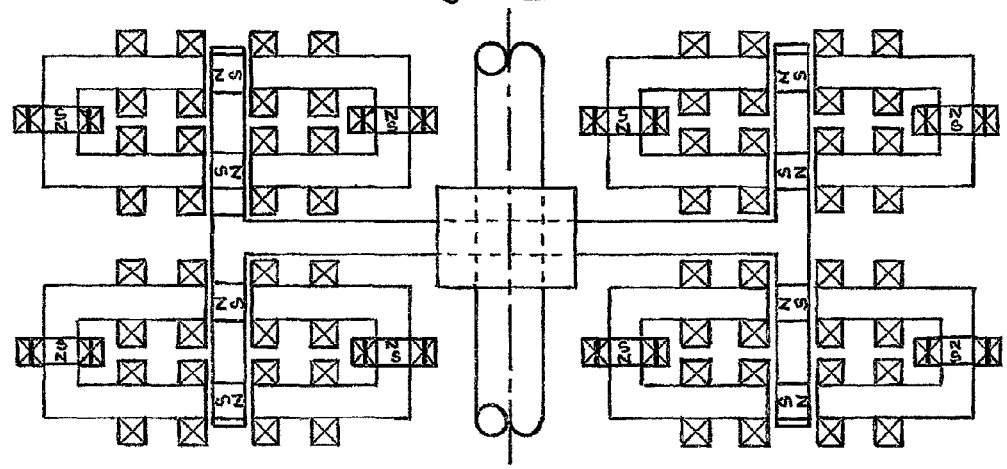
Figure 15F:
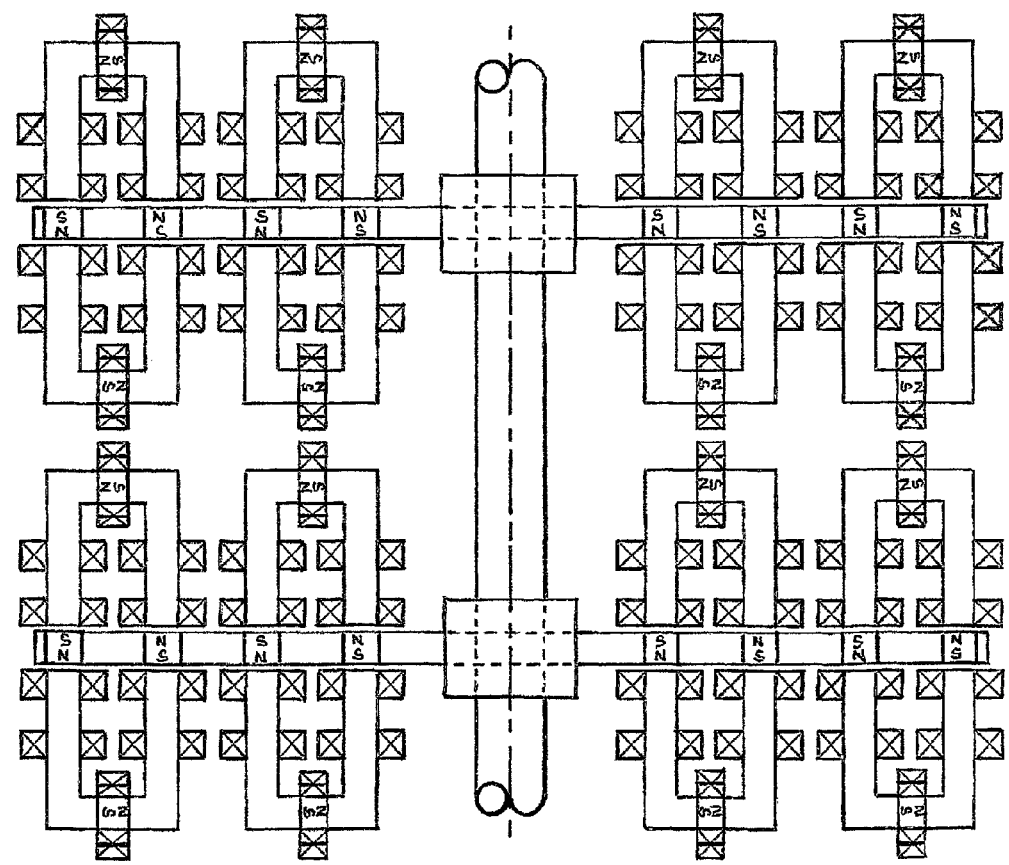

FIG. 15c; 15d; 15e; 15f show the possible constructions of the Tran-energy machines of the first sort.

Construction with Permanent Magnets in Halbach Arrays.

Figure 16A:
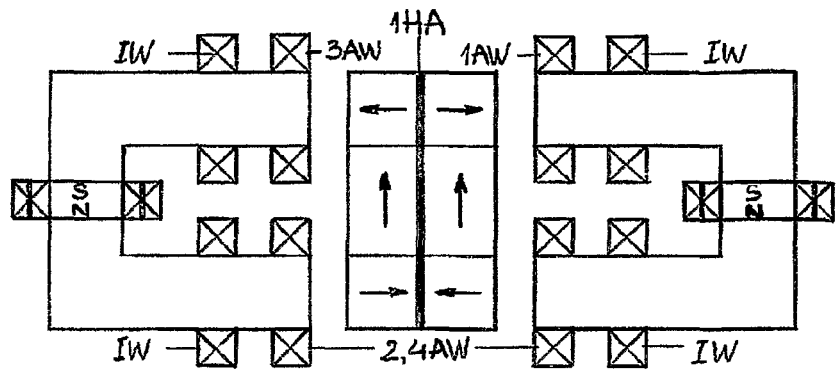
FIGS. 16a, 16b, 16c, 16d and 16e show permanent magnets in Halbach arrays that are suitable to use in the magnetic circuit(s) in the Tran energy machines that levitate magnets.
Figure 16B:
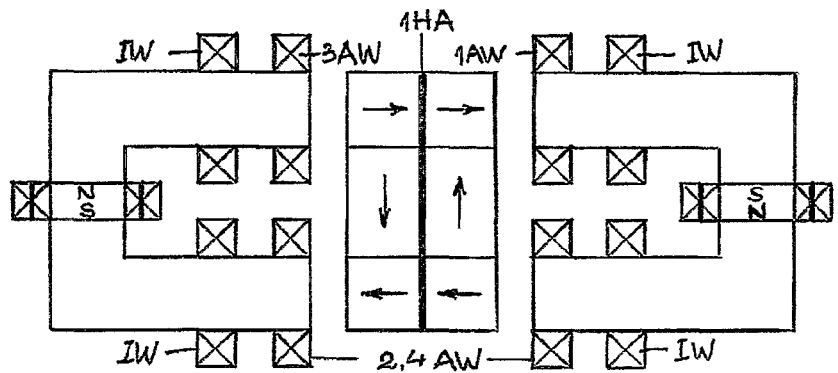

The permanent magnets in the Halbach arrays are suitable to use in the magnetic circuit(s) (FIG. 16a; 16b; 16c). This array heightens the magnetic flux lines in the core, therefore higher performance is acquired in the Tran-energy machines.

Figure 16C:
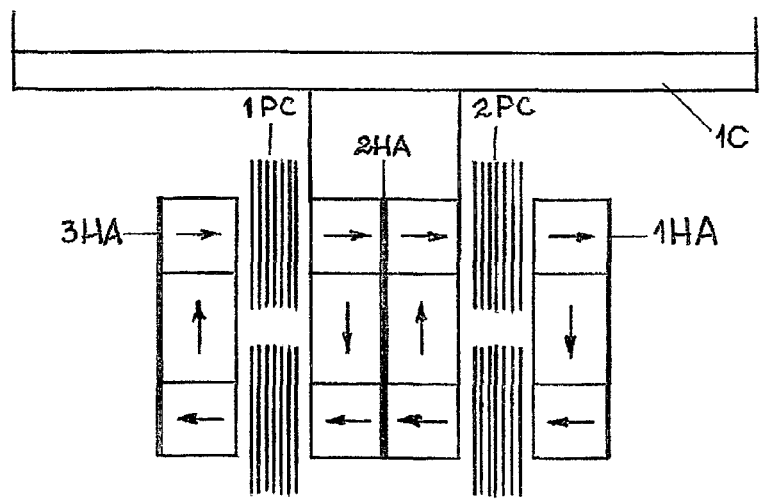

Construction with Planar, (Spiral/Helical) Concentric Coils (see FIG. 16c; 19c,d; 22).

In case of need, the planar (spiral/helical) concentric coils can be used to replace the functions of the activated coils (no secondary winding). These planar (spiral/helical) concentric coils are very suitable to reduce the mass of the Tran-energy machine of the first and second sort.

A firm foundation is necessary in order to install these planar coils in the gap(s) of the magnetic-circuits with permanent magnet source. Dimensions of the holes in the centre of the planar coils depend on each construction apart.

Layers of the winding in planar coils are preferably wound in an even number.

It is possible that just one activated coil is strong enough to shift the flowing of magnetic flux lines in or out the toroidal cores (see FIGS. 19a and 19c), with purpose of producing electric energy.

Figure 19A:
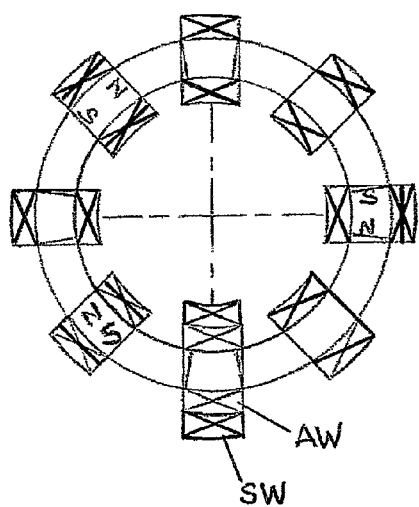
FIGS. 19a and 19b show activated coil strong enough to shift magnetic flux lines into or out of the toroidal cores for producing electric energy.
Figure 19B:
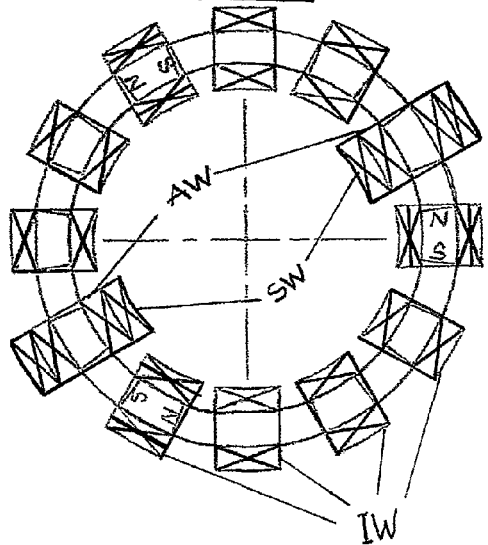
Figure 19C:
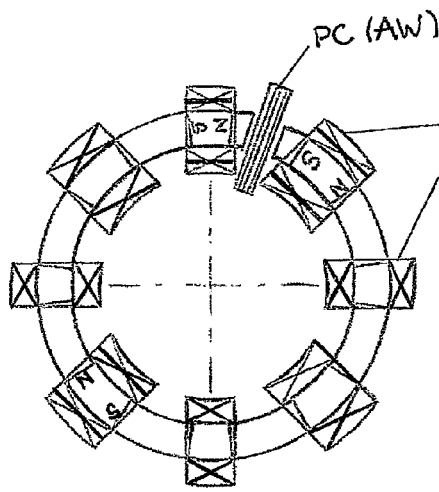
FIGS. 19c and 19d show broken tori with inserted permanent magnets and planar coils for the Tran energy machines of the second sort.
Figure 19D:
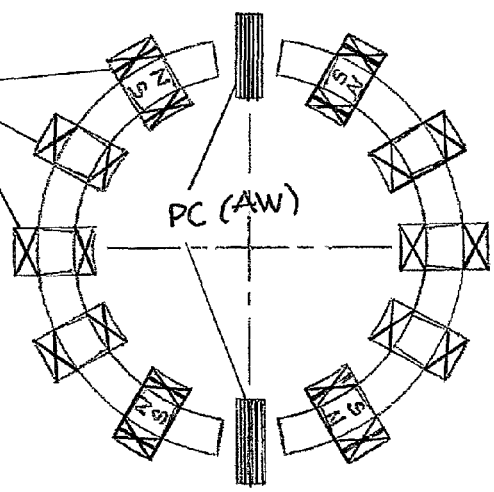

FIGS. 19c and 19d show broken tori with inserted permanent magnets and planar coils for the Tran-energy machines of the second sort.

FIG. 16c shows a combination of permanent magnets in Halbach array and planar coil.

As mentioned above, different utilizing the magnetic interactions, and the forms of the machines, make the different sorts of the Tran-energy machines.

Figures 17A, 17B:
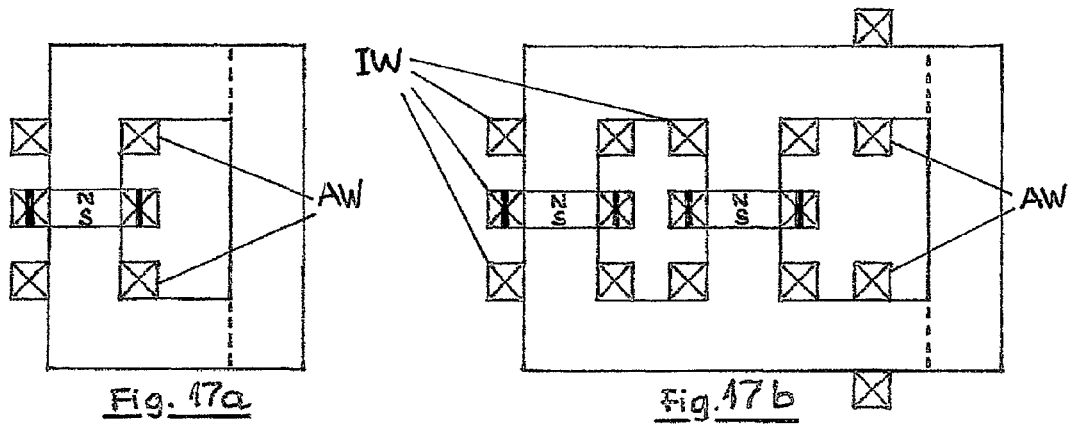
FIGS. 17a-17d show the basic forms of Tran energy machines of the third sort (producing electric energy and inductive heating).
Figure 17C:
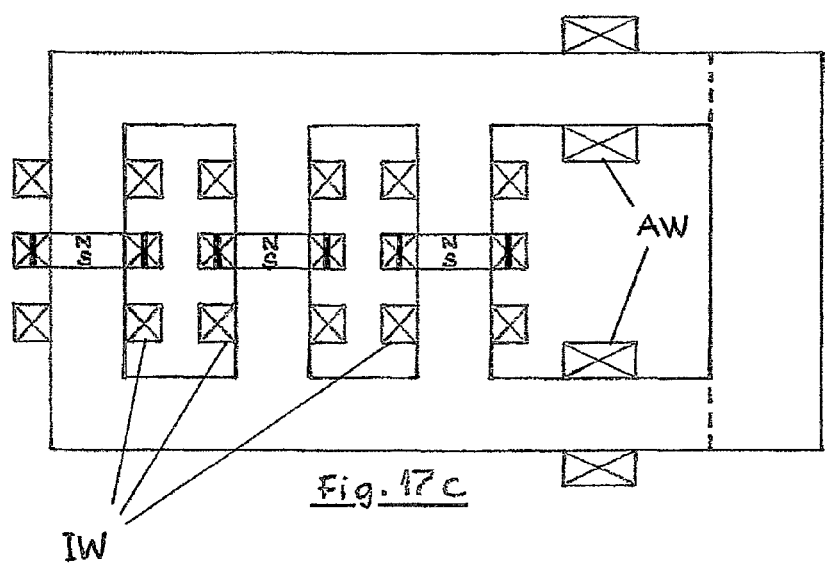
Figure 17D:
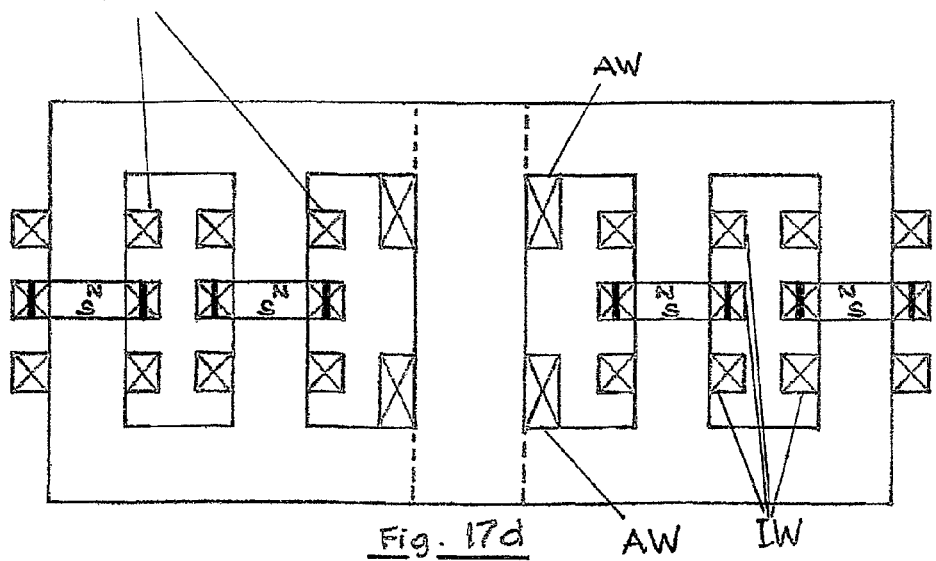

FIG. 17 shows the basic forms of the third sort (producing electric energy and inductive heating). A part of the core (marked with the dotted line) can be removed in order to put the bearing(s), or other articles for inductive heating treatments.

Figure 18A:
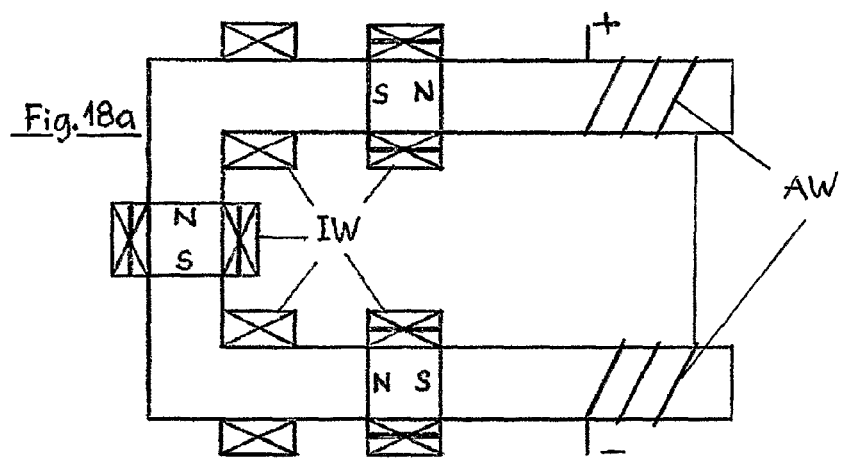
FIGS. 18a-18c show Tran energy machines of the fourth sort (producing electric energy and magnetic pulses) in which electric pulses applied to the activated coils can change the magnetic pole thereof and in the field of magnetic pulses, the direction of ejected ions from the ioniser can be shifted.
Figure 18B:
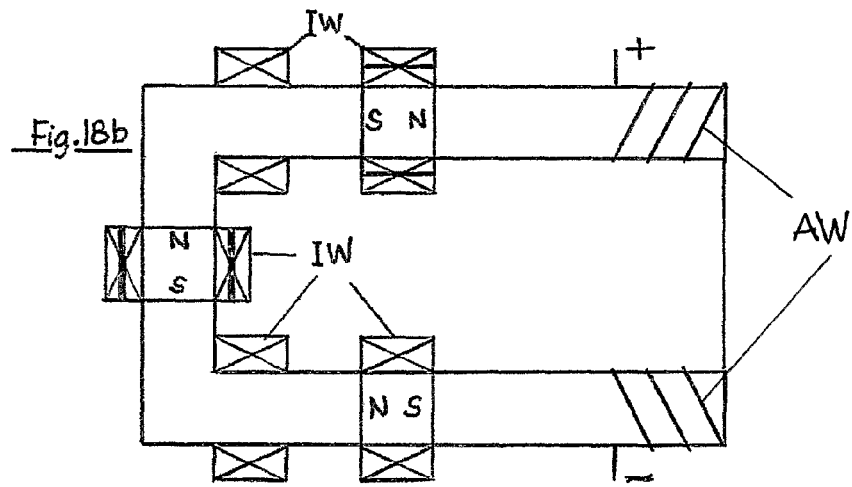
Figure 18C:
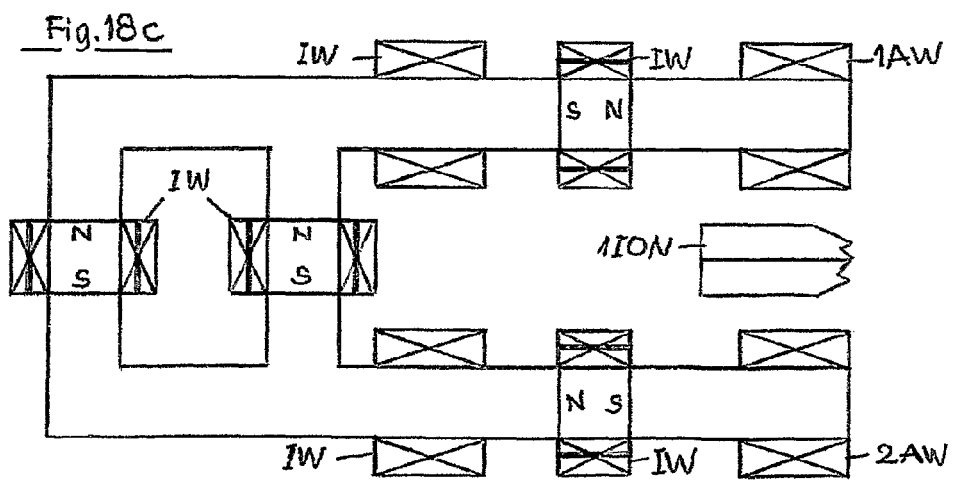

In the fourth sort—producing electric energy and magnetic pulse—the electric pulses applied to the activated coils, can change the magnetic pole of the activated coils, and in the field of magnetic pulses, the direction of ejected ions from the ioniser (1 ION) can be shifted (FIG. 18).

Applications of the principles of the Tran-energy machines in transportations result in new possibilities:

Longitudinally Guided Propulsion and Lateral Levitation.

Figure 16:
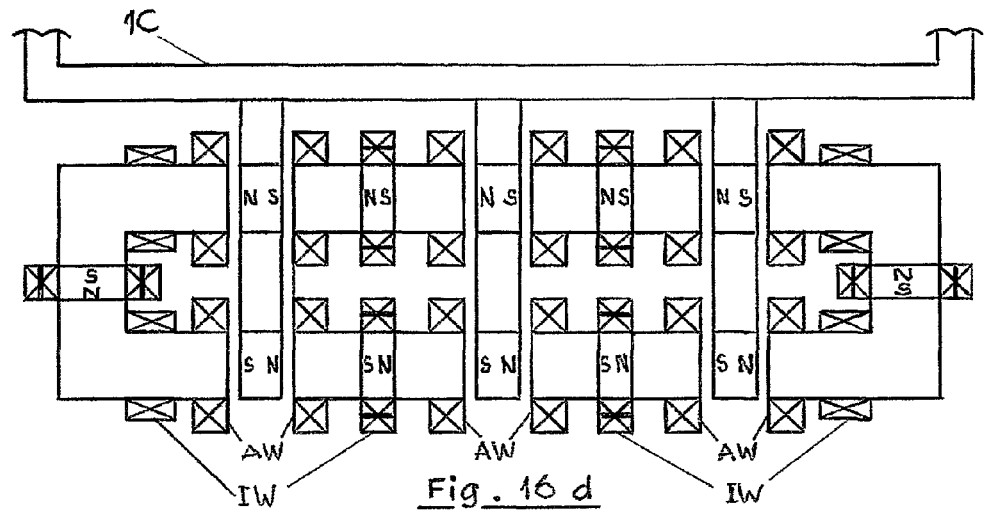
Figure 16:
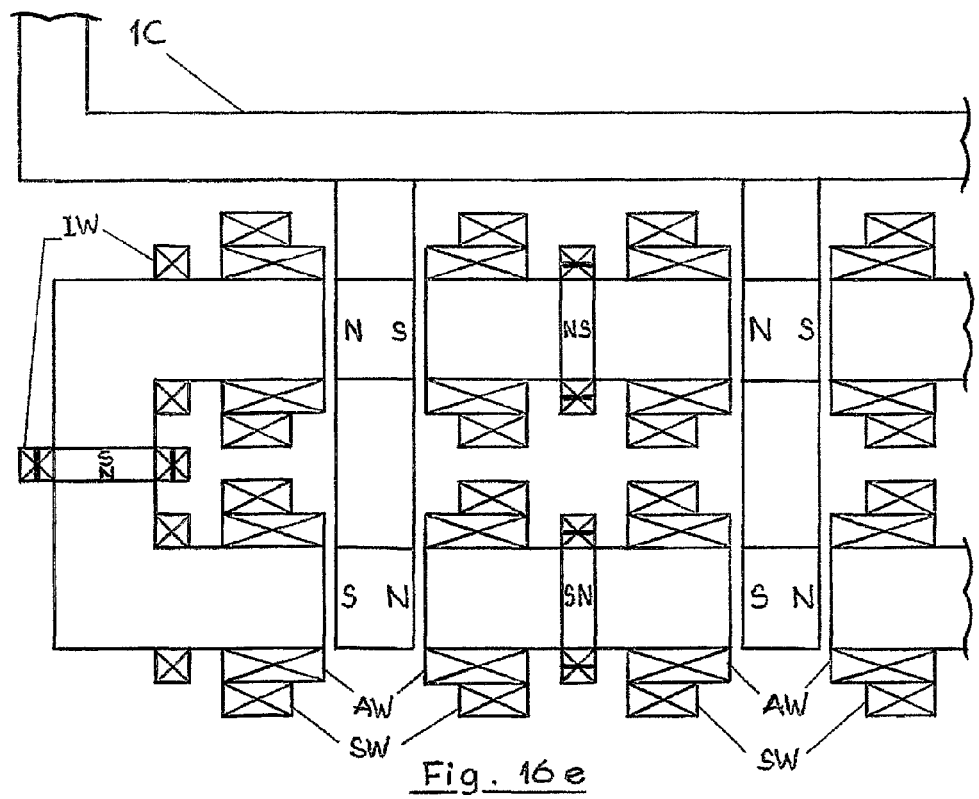

FIG. 16 shows the possible constructions keeping the carriers in levitation.

At every moment of moving, stop or parking, there are always free-magnetic attractive forces keeping the carriers levitated and balanced in the magnetic field.

On moving, the carriers are nearly at the same time guided (forwardly, vertically . . . ) by repulsive forces (and/or the attractive forces), and levitated by the symmetric attractive forces continuously.

These are very useful possibilities to make levitation trains, special levitation vehicles, lifts without motor and cables, and launchers of very high-speed projectiles or satellites.

FIG. 20 shows the X-form core as stator of the machine. The rotor consists of permanent magnets with sequential alternating pole-faces (the axle is not drafted in the figure).

FIGS. 21a and 21b show the possibilities that, the rotary part of the Tran-energy machines can generate electric energy by itself. In place of permanent magnets on the rotor, the magnetic circuits with one or more permanent magnets, inductive and activated coils, are installed in the rotor.

The produced electric energy—except for its own use—can supply the other electric tools placed on the rotor.

FIG. 22 shows the other possibilities of combinations of planar (spiral/helical) concentric coils and permanent magnets in the stationary part. The other rotary parts contain the permanent magnets. The designed rotary directions, arrangements and positions of planar coils, of permanent magnets, are depended on the makers.

The planar (spiral/helical) concentric coils have the same functions as the activated coils. The electric energy regaining and the free-magnetic forces utilization are the same as the activated coils.

Moreover, principles of the Tran-energy machines can also be applied in the electric generators by means of utilizing the free-magnetic attractive force. It means that no electric energy is produced in this period, when the moving permanent magnets approach these stationary coils (Lenz's Law). The generators produce electric energy only when the magnetic attractive forces, caused by the inductive currents in these stationary coils, recall the moving permanent magnets.

The invention claimed is:

1. An electric energy converter for an electric activation source having a positive and a negative pole, and adapted to be connected to a plurality of external loads, at least one of said external loads being connected to the converter by a voltage regulator, comprising:

a magnetic core;
a primary winding, wound around the magnetic core;
a first rectifier bridge coupled to the primary winding in such orientation that a voltage induced in the primary winding is rectified by the first rectifier bridge;
a first activation switch connecting a first end of the primary winding to the positive pole of the electric activation source via a diode;
a second activation switch connecting a second end of the primary winding to the negative pole of the electric activation source;
a secondary winding, wrapped around the primary winding;
a second rectifier bridge coupled to the secondary winding in such orientation that a voltage induced in the secondary winding is rectified by the second rectifier bridge;
a first output switch coupling the rectified voltage induced in the primary winding to a first of said external loads;
a second output switch coupling the rectified voltage induced in the secondary winding to the voltage regulator connecting a second of said external loads to the converter;
a first inductive coil wrapped around the magnetic core;
a third rectifier bridge coupled to the first inductive coil, in such an orientation that a voltage induced in the first inductive coil is rectified by the third rectifier bridge;
a third output switch, for connecting the rectified voltage induced in the first inductive coil to the voltage regulator connecting a third of said external loads to the converter; and a plurality of permanent magnets, movably arranged with respect to the magnetic core, for inducing an alternative magnetic field within the magnetic core upon movement of the permanent magnets.

2. The electric energy converted according to claim 1, including means to couple the voltage induced in the primary winding to the positive pole of the electric activation source.

3. The electric energy converted according to claim 2, including means to couple the voltage induced in the primary winding to the positive pole of the electric activation source by the first output switch.

4. The electric energy converter according to claim 1, wherein the first of said external loads is a first voltage regulator with a first electrical load.

5. The electric energy converter according to claim 1, wherein the first of said external loads is a battery block.

6. The electric energy converter according to claim 1, wherein the magnetic core is separated by a core-separation.

7. The electric energy converter according to claim 1, wherein the magnetic core is provided with at least one permanent magnet.

8. The electric energy converter according to claim 1, further comprising a control circuit providing the primary winding with a pulsed voltage to change the flow of the magnetic field in the magnetic circuit of the core.

9. The electric energy converter according to claim 8 further comprising a timer control controlling the pulse voltage, wherein the length of the pulsed voltage is shorter than five times the inductance of the primary winding, divided by the resistance of the primary winding.

10. The electric energy converter according to claim 8, wherein said control circuit is oriented so that the pulse attracts and repels at least one of the plurality of permanent magnets producing kinetic energy, and blocks a normal magnetic flux of the permanent magnet in the core magnetic circuit.

11. The electric energy converter according to claim 8 further comprising a storage unit for storing energy when the magnetic field in the magnetic core changes due to the moving permanent magnet.

12. The electric energy converter according to claim 8, wherein the activated primary winding is oriented to block the flow of magnetic flux of the permanent magnet.

13. The electric energy converter according to claim 1, including means to convert the moving permanent magnets attracting or repelling magnetic fields to kinetic energy.

14. The electric energy converter according to claim 8 further comprising a position sensor for determining a switching pattern of the activation switches based on the moving permanent magnets.

15. The electric energy converter according to claim 8, including an ionizer between the poles of said activation source wherein the control circuit pulsed voltage is oriented to change magnetic poles of the activated coils, and change direction of ejected ions from said ionizer.

16. The energy conversion device in claim 6, wherein the core separating device is provided with at least one permanent magnet.

17. An energy conversion device for an electric activation source adapted to be connected to a plurality of external loads, comprising:
at least one magnetic core assimilating a flux line emitted by a permanent magnet in a magnetic circuit;
a plurality of inductive coils disposed on said magnetic core;
a plurality of activation windings disposed on said magnetic core redirecting the flow of magnetic flux lines;
a plurality of switches for progressively electrically activating and deactivating said activation windings;
a plurality of rectifier bridges redirecting the inductive coils and activation windings voltages from a first path to a second path to obtain rectified voltages;
a plurality of output switches for connecting the rectified voltages to one of the external loads;
a plurality of permanent magnets, having spaced-apart poles of opposite polarity, movably arranged with respect to the magnetic core, for inducing an alternating magnetic field within the core upon movement of the permanent magnets; and
wherein activating and deactivating the windings attracts or repels the permanent magnets generating kinetic energy.

18. The energy conversion device in claim 17 including a rotor, wherein the plurality of moving permanent magnets is disposed on said rotor and angularly spaced therearound.

19. The energy conversion device in claim 17, further comprising a plurality of position sensor for determining switching pattern of the activation switches based on the moving permanent magnets.

20. An method for energy conversion comprising the steps of:
providing an energy converter according to claim 8;
activating and deactivating the primary winding wound around a magnetic core with the first and second activation switches;
wrapping the secondary winding around the primary winding and producing a winding induced voltage;
wrapping at least one inductive coil around the magnetic core and producing a coil induced voltage;
rectifying the windings and coil induced voltage with the rectifier bridge;
coupling at least one output switch to the windings and the coil rectified voltage to the voltage regulator and the external load for storage;
wherein the first and second activation switches are connected to opposite ends of the primary winding electrical path, so that the activating and deactivating generates induced voltage through the secondary winding and inductive coil.

21. The method for energy conversion in claim 20, further comprising the steps of:
providing a rotor;
disposing a plurality of moving permanent magnets on the rotor angularly spaced there around;
providing a sensor for determining the switching pattern of the actuation switches resulting from the movement of the moving permanent magnets; and
activating and deactivating the switches to attract and repel the plurality of moving permanent magnets, generating kinetic energy.

22. The method for energy conversion in claim 20, further comprising determining a switching pattern of the activation switches based on a position sensor of the moving permanent magnets.

* * * * *